US009753560B2

(12) United States Patent
Okuno

(10) Patent No.: US 9,753,560 B2
(45) Date of Patent: Sep. 5, 2017

(54) INPUT PROCESSING APPARATUS

(71) Applicant: SONY MOBILE COMMUNICATIONS JAPAN, INC., Minato-ku (JP)

(72) Inventor: Takayoshi Okuno, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 254 days.

(21) Appl. No.: 13/727,402

(22) Filed: Dec. 26, 2012

(65) Prior Publication Data

US 2013/0181941 A1 Jul. 18, 2013

Related U.S. Application Data

(60) Provisional application No. 61/581,665, filed on Dec. 30, 2011.

(51) Int. Cl.
*G06F 3/041* (2006.01)
*G06F 3/044* (2006.01)
*G06F 3/038* (2013.01)
*G06F 3/048* (2013.01)

(52) U.S. Cl.
CPC .............. *G06F 3/041* (2013.01); *G06F 3/038* (2013.01); *G06F 3/044* (2013.01); *G06F 3/0416* (2013.01); *G06F 3/048* (2013.01); *G06F 2203/04108* (2013.01)

(58) Field of Classification Search
CPC ........................................ G06F 3/048-3/04897
USPC .................................................. 345/173-174
See application file for complete search history.

(56) References Cited

U.S. PATENT DOCUMENTS

| 2008/0122798 | A1* | 5/2008 | Koshiyama et al. | 345/173 |
| 2008/0141149 | A1* | 6/2008 | Yee et al. | 715/764 |
| 2008/0165140 | A1* | 7/2008 | Christie et al. | 345/173 |
| 2008/0246778 | A1* | 10/2008 | Ham et al. | 345/646 |
| 2009/0315826 | A1* | 12/2009 | Lin et al. | 345/157 |
| 2012/0216140 | A1* | 8/2012 | Smith | G06F 3/0481 715/780 |
| 2013/0271419 | A1* | 10/2013 | Sharma et al. | 345/173 |

* cited by examiner

*Primary Examiner* — Hang Lin
(74) *Attorney, Agent, or Firm* — Oblon, McClelland, Maier & Neustadt, L.L.P.

(57) ABSTRACT

An input processing apparatus, including a consecutive input operation interval detector that detects a time interval between consecutive input operations received at the input processing apparatus; and an information processing unit that conducts information processing based on the detected time interval.

11 Claims, 32 Drawing Sheets

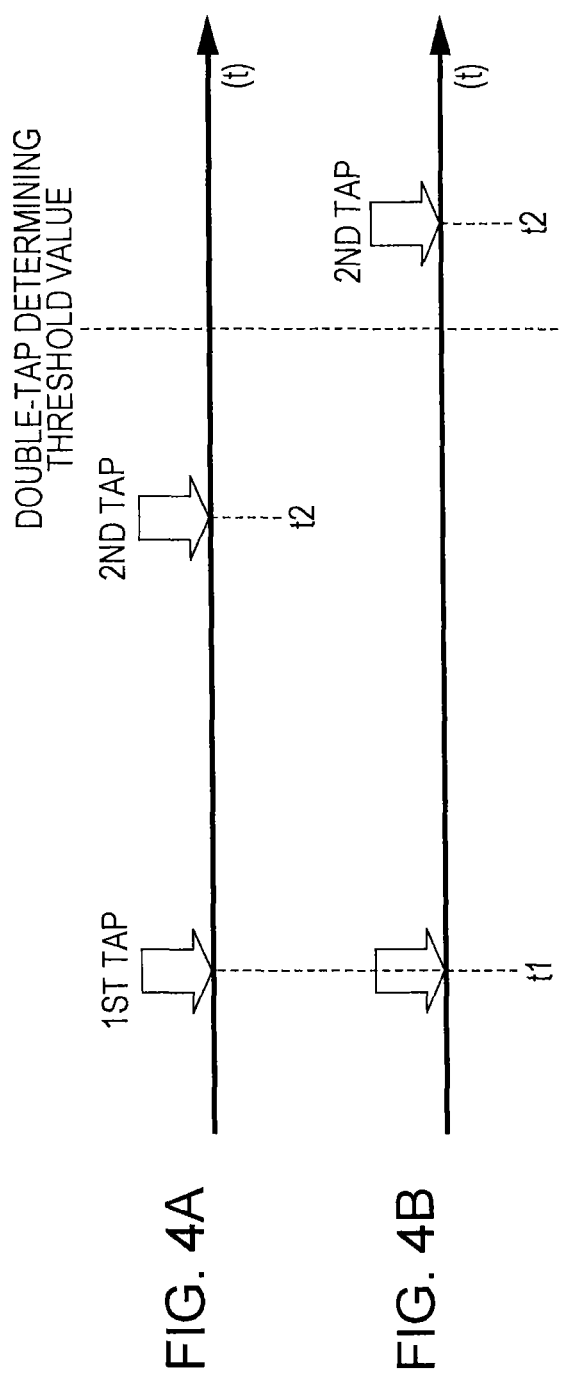

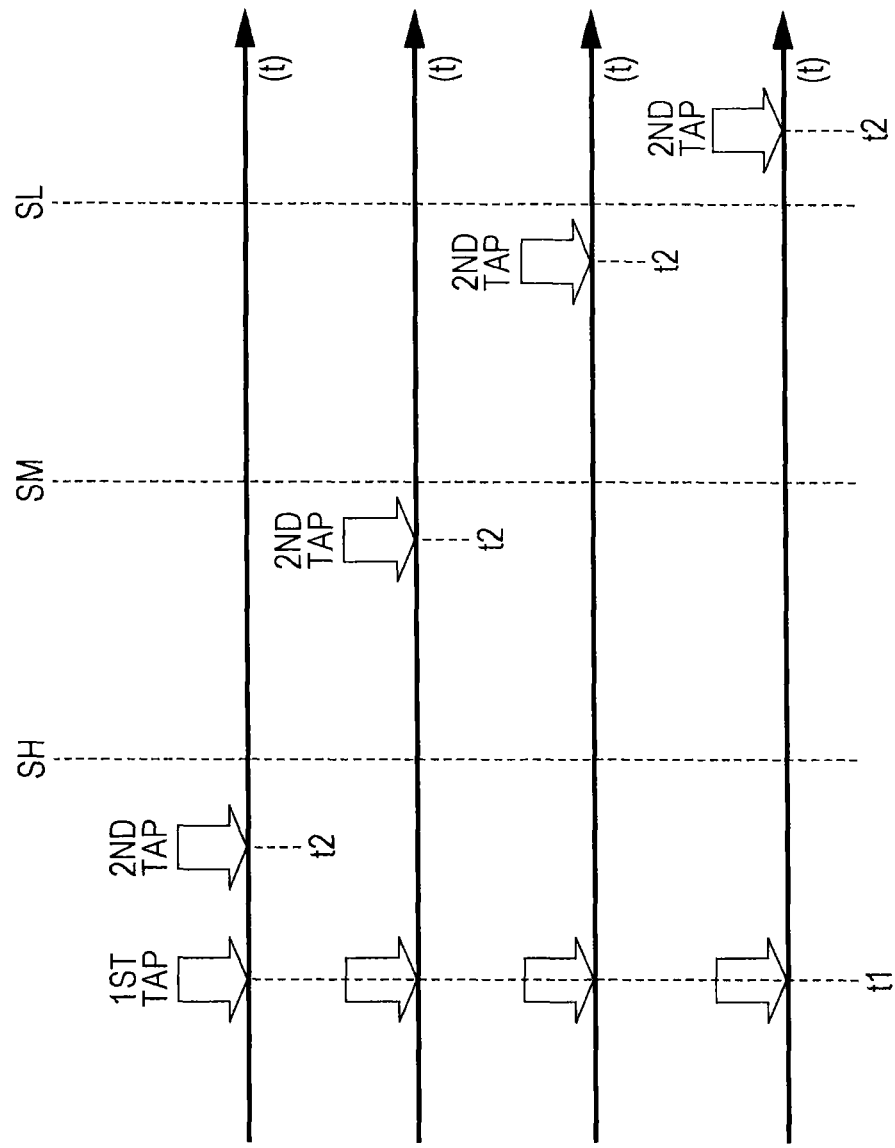

FIG. 23

| Y\X | 1 | 2 | 3 | 4 | 5 | 6 | 7 | 8 | 9 | 10 |
|---|---|---|---|---|---|---|---|---|---|---|
| 1 | 10 | 8 | 8 | 10 | 7 | 8 | 7 | 9 | 10 | 8 |
| 2 | 8 | 7 | 9 | 7 | 8 | 7 | 8 | 7 | 8 | 8 |
| 3 | 8 | 8 | 10 | 7 | 8 | 7 | 9 | 10 | 8 | 9 |
| 4 | 7 | 8 | 7 | 8 | 7 | 8 | 8 | 10 | 7 | 9 |
| 5 | 7 | 8 | 7 | 10 | 7 | 8 | 7 | 9 | 10 | 8 |
| 6 | 10 | 7 | 8 | 8 | 10 | 7 | 8 | 7 | 9 | 10 |
| 7 | 7 | 9 | 10 | 10 | 7 | 8 | 8 | 8 | 10 | 7 |
| 8 | 7 | 9 | 8 | 10 | 7 | 8 | 7 | 9 | 10 | 8 |
| 9 | 8 | 8 | 8 | 7 | 9 | 10 | 8 | 8 | 10 | 7 |
| 10 | 9 | 10 | 10 | 8 | 8 | 7 | 9 | 10 | 8 | 10 |
| 11 | 8 | 7 | 9 | 9 | 10 | 10 | 8 | 8 | 10 | 7 |
| 12 | 8 | 10 | 7 | 9 | 9 | 8 | 10 | 7 | 9 | 10 |
| 13 | 8 | 7 | 90 | 10 | 8 | 8 | 7 | 9 | 10 | 8 |
| 14 | 7 | 90 | 100 | 90 | 8 | 8 | 10 | 7 | 9 | 9 |
| 15 | 8 | 8 | 90 | 8 | 7 | 8 | 7 | 9 | 10 | 8 |
| 16 | 9 | 10 | 9 | 10 | 8 | 7 | 9 | 10 | 8 | 10 |
| 17 | 8 | 7 | 9 | 10 | 8 | 8 | 7 | 9 | 10 | 8 |
| 18 | 8 | 10 | 7 | 9 | 9 | 7 | 8 | 7 | 9 | 10 |
| 19 | 8 | 7 | 9 | 10 | 8 | 7 | 10 | 8 | 8 | 10 |
| 20 | 8 | 8 | 10 | 7 | 8 | 7 | 9 | 10 | 8 | 9 |

FIG. 24

| X\Y | 1 | 2 | 3 | 4 | 5 | 6 | 7 | 8 | 9 | 10 |
|---|---|---|---|---|---|---|---|---|---|---|
| 1 | 10 | 8 | 8 | 10 | 7 | 8 | 7 | 9 | 10 | 8 |
| 2 | 8 | 7 | 9 | 7 | 8 | 7 | 8 | 7 | 8 | 8 |
| 3 | 8 | 8 | 10 | 7 | 8 | 7 | 9 | 10 | 8 | 9 |
| 4 | 7 | 8 | 7 | 8 | 7 | 8 | 8 | 10 | 7 | 9 |
| 5 | 7 | 8 | 7 | 10 | 7 | 8 | 7 | 9 | 10 | 8 |
| 6 | 10 | 7 | 8 | 8 | 10 | 7 | 8 | 7 | 9 | 10 |
| 7 | 7 | 9 | 10 | 10 | 7 | 8 | 8 | 8 | 10 | 7 |
| 8 | 7 | 9 | 8 | 10 | 7 | 8 | 7 | 9 | 10 | 8 |
| 9 | 8 | 8 | 8 | 7 | 9 | 10 | 8 | 8 | 10 | 7 |
| 10 | 9 | 10 | 10 | 8 | 8 | 7 | 9 | 10 | 8 | 10 |
| 11 | 8 | 7 | 9 | 9 | 10 | 10 | 8 | 8 | 10 | 7 |
| 12 | 8 | 10 | 30 | 9 | 9 | 8 | 10 | 7 | 9 | 10 |
| 13 | 8 | 7 | 40 | 30 | 8 | 8 | 7 | 9 | 10 | 8 |
| 14 | 7 | 30 | 50 | 40 | 30 | 8 | 10 | 7 | 9 | 9 |
| 15 | 8 | 20 | 30 | 40 | 30 | 8 | 7 | 9 | 10 | 8 |
| 16 | 9 | 10 | 20 | 20 | 8 | 7 | 9 | 10 | 8 | 10 |
| 17 | 8 | 7 | 9 | 10 | 8 | 8 | 7 | 9 | 10 | 8 |
| 18 | 8 | 10 | 7 | 9 | 9 | 7 | 8 | 7 | 9 | 10 |
| 19 | 8 | 7 | 9 | 10 | 8 | 7 | 10 | 8 | 8 | 10 |
| 20 | 8 | 8 | 10 | 7 | 8 | 7 | 9 | 10 | 8 | 9 |

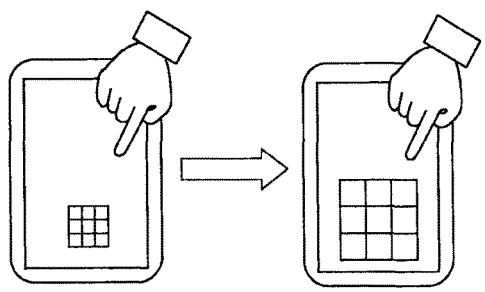

FIG. 30A

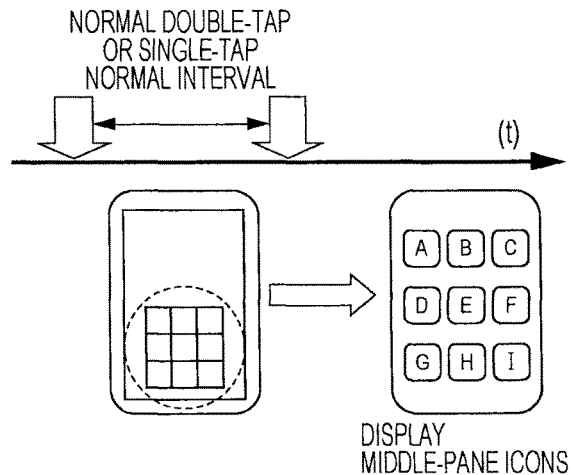

FIG. 30B
NORMAL DOUBLE-TAP OR SINGLE-TAP NORMAL INTERVAL

DISPLAY MIDDLE-PANE ICONS

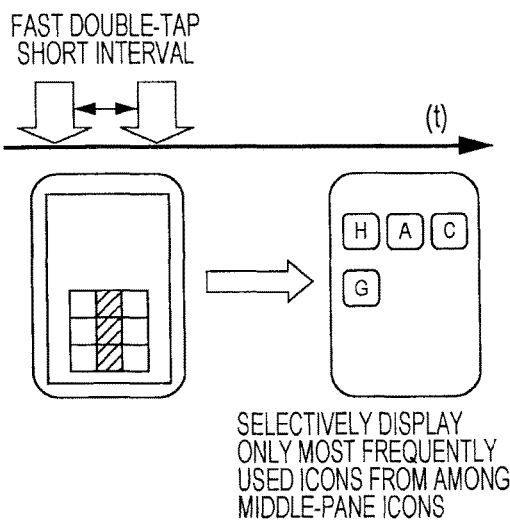

FIG. 30C
FAST DOUBLE-TAP SHORT INTERVAL

SELECTIVELY DISPLAY ONLY MOST FREQUENTLY USED ICONS FROM AMONG MIDDLE-PANE ICONS

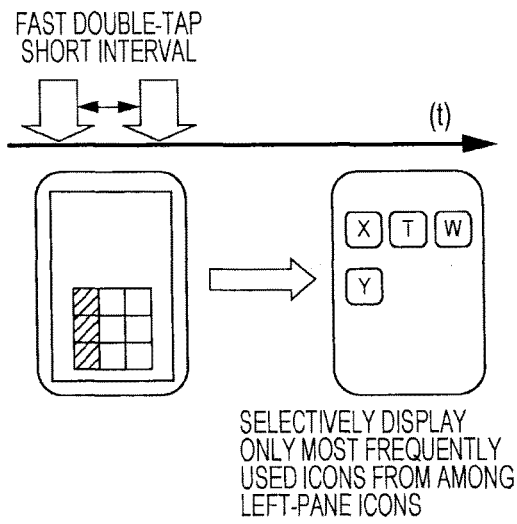

FIG. 30D
FAST DOUBLE-TAP SHORT INTERVAL

SELECTIVELY DISPLAY ONLY MOST FREQUENTLY USED ICONS FROM AMONG LEFT-PANE ICONS

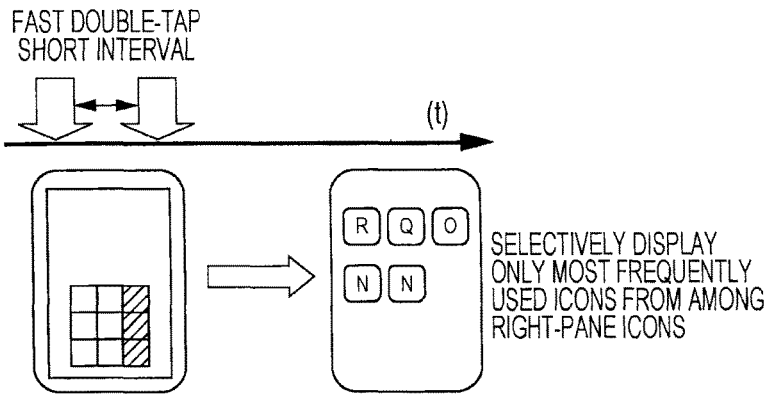

FIG. 30E
FAST DOUBLE-TAP SHORT INTERVAL

SELECTIVELY DISPLAY ONLY MOST FREQUENTLY USED ICONS FROM AMONG RIGHT-PANE ICONS

INPUT PROCESSING APPARATUS

CROSS REFERENCE TO RELATED APPLICATIONS

This application is related to and claims priority under 35 U.S.C. §119(e) to Provisional Application Ser. No. 61/581,665, filed Dec. 30, 2011, the contents of which are hereby incorporated herein by reference.

BACKGROUND

1. Field

The present specification relates to an ideal input processing apparatus applied to an electronic device such as a mobile phone, a PHS phone (PHS: Personal Handyphone System), a PDA device (PDA: Personal Digital Assistant), an electronic camera device, an electronic video camera device, a portable game console, or a notebook personal computer, which is provided with input processing functions that display display objects corresponding to input operations on a display unit.

Particularly, it relates to an input processing apparatus configured to conduct different information processing depending on the temporal interval between "consecutive input operations", such as a so-called double-tap operation in which a display unit constituting a touch panel is consecutively touched, or a so-called double-click operation in which a given hardware key or mouse device is consecutively pressed, for example.

2. Description of the Related Art

With currently known electronic devices such as mobile phones and personal computers, "consecutive input operations", such as a so-called double-tap operation in which a display unit constituting a touch panel is consecutively touched, or a so-called double-click operation in which a given hardware key or mouse device is consecutively pressed, for example, are known as one type of operation for specifying desired information processing.

For example, the controller of a mobile phone that includes a display unit constituting a touch panel may determine that the above consecutive input operation (in this case, a double-tap operation) has been performed when two touch operations (tap operations) within a fixed spatial range and also within a fixed temporal range are detected. Then, upon determining that the double-tap operation has been conducted, the controller conducts information processing associated with that double-tap operation, such as activating a given application program or activating a given function, for example.

CITATION LIST

Patent Literature

[PTL 1] Japanese Unexamined Patent Application Publication No. 2011-227586

[PTL 2] Japanese Unexamined Patent Application Publication No. 2011-205551

[PTL 3] Japanese Unexamined Patent Application Publication No. 2007-86977

Technical Problem

However, with conventional electronic devices, the information processing executed by a controller when a consecutive input operation such as the above double-tap operation is performed is only one type of information processing associated with that consecutive input operation.

Specifically, in the case where an email icon being displayed on a display unit is double-tapped, for example, the controller applies control to activate an email application program. This is because only one type of information processing, namely "activate email application program", is associated in advance as the information processing for when an email icon is double-tapped.

In this way, there has a problem of poor usability in conventional electronic devices, in which the information processing specifiable by the user with consecutive input operations is limited to only one type of information processing.

The inventor of the present specification recognizes the need for an input processing apparatus attempting to improve usability by making information processing corresponding to plural types of consecutive input operations executable.

BRIEF SUMMARY

In light of the need discussed above, an input processing apparatus in accordance with an embodiment includes a consecutive input operation interval detector that detects a time interval between consecutive input operations received at the input processing apparatus; and an information processing unit that conducts information processing based on the detected time interval.

In accordance with another embodiment, a method, implemented on an input processing apparatus, includes detecting a time interval between consecutive input operations received at the input processing apparatus; and conducting information processing based on the detected time interval.

Also, in light of the need discussed above, an input processing apparatus in accordance with an embodiment includes a consecutive input operation interval detector that detects a temporal consecutive input operation interval of a consecutive input operation plurally and consecutively conducted within a given operation range, an operation position detector that detects the operation position where the consecutive input operation is performed, and an information processing unit that conducts information processing corresponding to a consecutive input operation interval detected by the consecutive input operation interval detector and an operation position detected by the operation position detector.

Also, in light of the need discussed above, an input processing apparatus in accordance with an embodiment includes a consecutive touch input operation interval detector that detects a temporal consecutive input operation interval of touch operations plurally and consecutively conducted within a given operation range, on the basis of capacitance values that vary due to an operating element touching a capacitive display unit, an operation position detector that detects the operation position where the consecutive input operation is performed, a contactless operation identifier that identifies the type of a consecutive contactless input operation and a contactless operation position, on the basis of capacitance values that vary depending on the distance between the operating element and the capacitive display unit, and an information processing unit that conducts information processing corresponding to a consecutive input operation interval detected by the consecutive touch input operation interval detector and an operation position detected by the operation position detector, and also conducts information processing corresponding to a consecutive input operation type and a contactless operation position identified by the contactless operation identifier.

The present embodiments are able to make respectively different information processing executable in correspondence with plural types of consecutive input operations. For this reason, improvement in the usability of an electronic device to which the present invention is applied can be attempted.

BRIEF DESCRIPTION OF THE DRAWINGS

FIGS. 4A and 4B are diagrams for explaining typical double-tap operation timings.

FIGS. 5A, 5B, 5C, and 5D are diagrams for explaining various double-tap operation timings in a mobile phone according to a first embodiment.

FIG. 23 is a diagram illustrating a capacitance map during a touch operation.

FIG. 24 is a diagram illustrating a capacitance map during a contactless operation.

FIGS. 30A, 30B, 30C, 30D, and 30E are diagrams for explaining exemplary actions corresponding to touch operation and contactless operation in a mobile phone according to a third embodiment.

DETAILED DESCRIPTION

The present embodiments may be applied to a mobile phone as an example.

[First Embodiment]

(Configuration of Mobile Phone)

Figure 1:
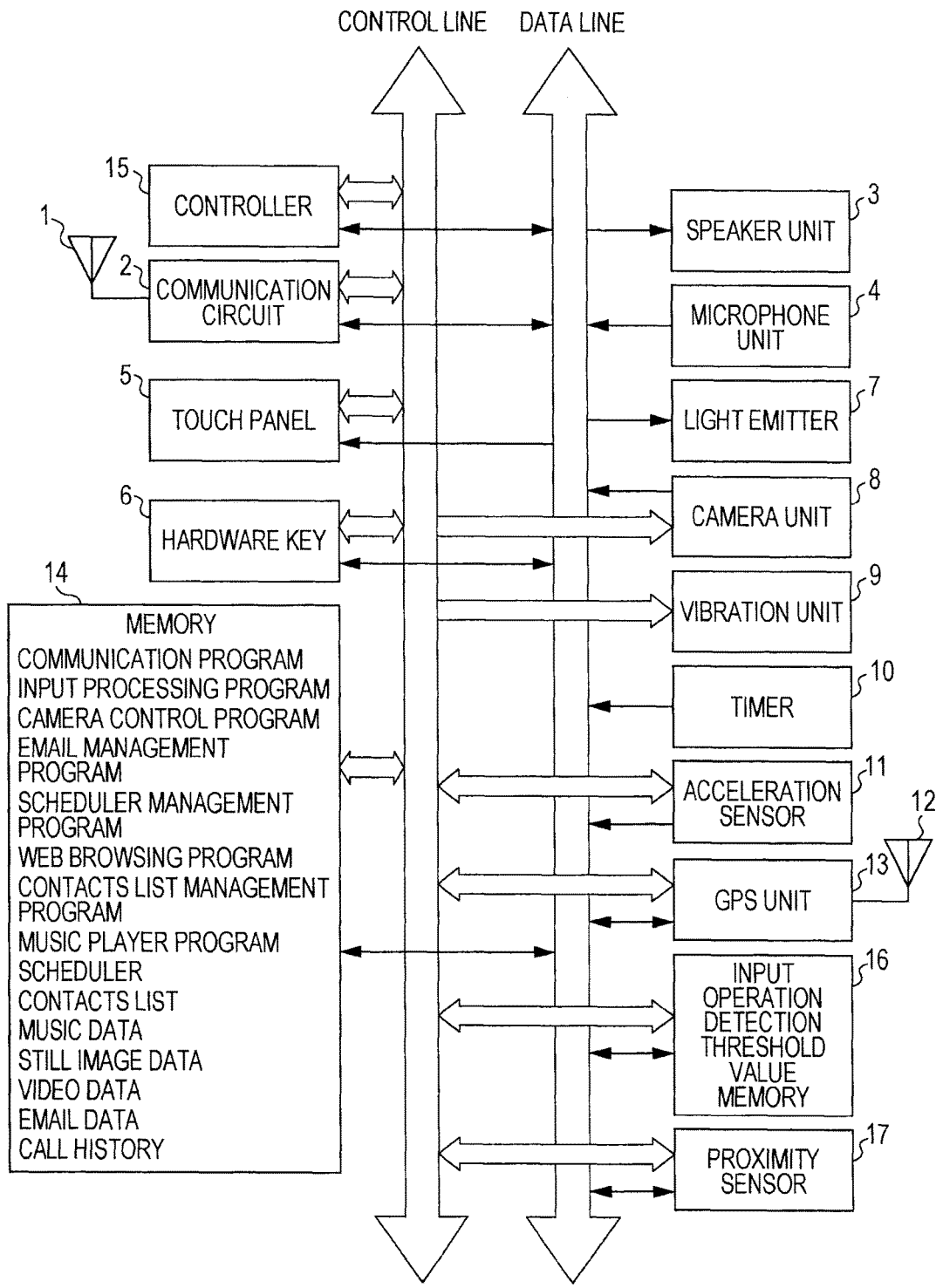
FIG. 1 is a block diagram of a mobile phone according to a first embodiment.

FIG. 1 is a block diagram of a mobile phone according to a first embodiment. As illustrated in FIG. 1, a mobile phone according to the first embodiment includes an antenna 1 and a communication circuit 2 that conducts wireless communication such as audio telephony, video telephony, email, and web data (web: World Wide Web) with a base station.

This mobile phone also includes a speaker unit 3 for obtaining acoustic output of telephony receiver audio, a microphone unit 4 for picking up telephony transmitter audio, a touch panel 5 which displays operable buttons, icons, still images, and video while also enabling touch operations in which the user touches a display screen with an operating element such as his or her finger, and a plurality of hardware keys 6 physically provided on the case of the mobile phone.

This mobile phone also includes a light emitter 7 (LED: Light Emitting Diode) for notifying the user of transmit or receive signals with light, a camera unit 8 for shooting a still image or video of a desired subject, a vibration unit 9 for notifying the user of transmit or receive signals by causing the case of the mobile phone to vibrate, and a timer 10 that keeps the current time.

The mobile phone also includes an acceleration sensor 11 for detecting shake operations, etc. imparted to the case of the mobile phone, as well as a GPS antenna 12 (GPS: Global Positioning System) and a GPS unit 13 for detecting the present location of the mobile phone and the shooting location of still images or videos shot with the camera unit 8.

The mobile phone also includes memory 14 storing a communication program for conducting the wireless communication processing via a base station and various application programs in addition to various data handled by these various application programs, and a controller 15 that controls overall action of the mobile phone.

The mobile phone is also configured to accept so-called double-tap operations, in which the display screen of the touch panel 5 is touched twice consecutively, as one of the input operations by the user. Similarly, the mobile phone is configured to accept so-called double-click operations, in which one of the hardware keys 6 provided on the case of the mobile phone is pressed twice consecutively.

Also, in the case of this mobile phone, it is configured such that different information processing is executed depending on the amount of time (interval) from a first tap operation until the next tap operation is performed in a double-tap operation.

In other words, in the case of this mobile phone, there exist plural types of double-tap operations depending on the amount of time (interval) from a first tap operation until the next tap operation is performed as a double-tap operation, and respectively different information processing is assigned to these double-tap operations.

Similarly, in the case of this mobile phone, there exist plural types of double-click operations depending on the amount of time (interval) from a first click operation until the next click operation is performed as a double-click operation, and respectively different information processing is assigned to these double-click operations.

Additionally, the mobile phone includes input operation detection threshold value memory 16 storing plural threshold values for determining types of such double-tap operations or double-click operations on the basis of the temporal interval of the double-tap operations or double-click operations.

The mobile phone also includes one or a plurality of proximity sensors 17 that detect the presence or absence or a the user's finger in proximity to the touch panel 5.

The proximity sensor 17 is formed by an infrared photo coupler, for example, and is configured to receive reflected infrared light which is reflected by the user's finger due to the user's finger nearing the touch panel 5, and to detect the presence or absence of the user's finger in proximity and its distance from the touch panel 5 on the basis of the reflected light intensity.

A projected capacitance touch panel is provided as the touch panel 5. The projected capacitance touch panel includes a resistive film with an electrode layer underneath, as well as a substrate layer provided with a control IC (control integrated circuit).

In the electrode layer underneath the resistive film, many electrode patterns forming a mosaic consisting of two layers (horizontal and vertical) are arranged on a glass, plastic, or other substrate using transparent electrodes such as indium tin oxide (ITO).

The projected capacitive touch panel identifies an operation position by detecting changes in electrode capacitance due to a touch operation or a contactless operation from two (horizontal and vertical) electrode lines. By respectively providing many electrode lines in the horizontal and vertical directions, multipoint detection of touch operations becomes possible.

Although a projected capacitive touch panel is provided as the touch panel 5 in this example, what is called a surface capacitive touch panel or a pressure-sensitive touch panel may also be provided instead of the projected capacitive touch panel.

In addition to the above communication program, an input processing program for detecting input operations conducting by touching the touch panel 5 such as the above double-tap operation and input operations conducted by pressing a hardware key 6 such as the above double-click operation, and for controlling execution of information processing depending on respective input operations, is stored in the memory 14.

Also stored in the memory 14 are a camera control program for controlling the shooting of still images or video with the camera unit 8 as well as controlling the modification of the shooting magnification of a subject to be shot and the display magnification of a shot image which has been shot, an email management program for controlling the creation and transmitting/receiving of email, and a scheduler management program for managing a scheduler in which the user's schedule is registered.

Also stored in the memory 14 are a web browsing program for viewing web pages by transmitting/receiving information by accessing a server provided on a given network such as a communication network or the Internet, a contacts list management program for managing a contacts list that registers personal information such as the names, addresses, telephone numbers, email addresses, and facial photos of friends and acquaintances (i.e., the contacts list is a personal information registration area), and a music player program for playing back music data.

Also stored in the memory 14 is a scheduler in which the user's desired schedule is registered (i.e., a schedule data registration area), and a contacts list in which information such as the user names, still images (facial images, etc.), addresses, telephone numbers, email addresses, and birthdates of the user's friends and acquaintances is registered (i.e., a personal information registration area for respective users).

Also stored in the memory 14 are music data played back by the music player program, still image data and video data played back by a viewer function or video playback function in the camera control program, transmitted/received email data, and a history of transmitted/received telephone calls and emails.

(Input Processing Action in First Embodiment)

Such a mobile phone of the first embodiment is configured to accept plural types of double-tap operations depending on the amount of time from a first tap operation to the next tap operation in a double-tap operation on the touch panel 5 (tap operation interval).

Although later discussed in detail, the controller 15 of the mobile phone functions as an input operation detector 21, a touch interval determiner 22, and an application executor 23 illustrated enclosed by broken lines in FIG. 2 by acting on the basis of an input processing program stored in the memory 14, thereby determining the type of the double-tap operation and controlling execution of information processing or action corresponding to the determined type of double-tap operation.

Figure 3:
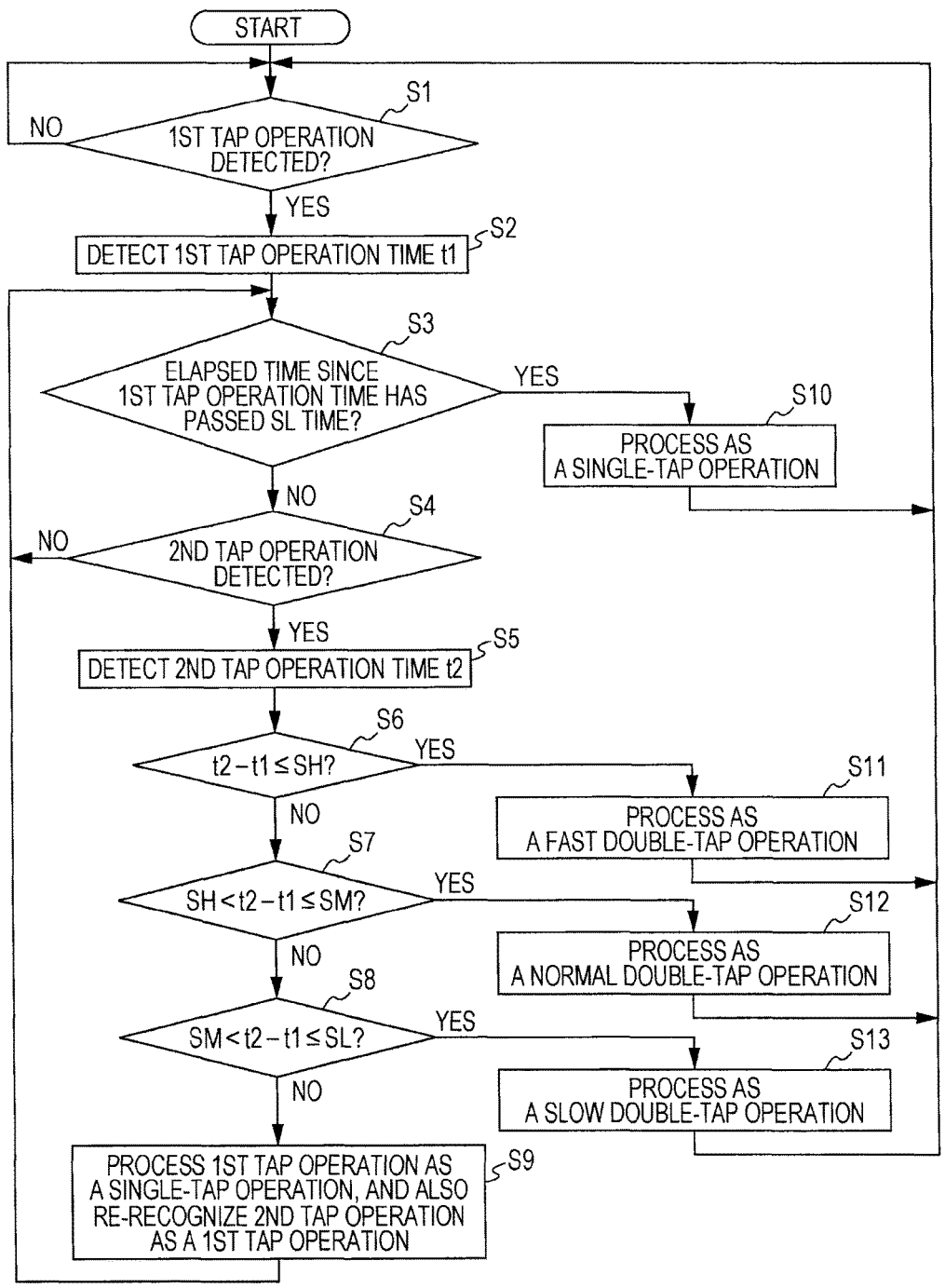
FIG. 3 is a flowchart for explaining input processing action of a mobile phone according to a first embodiment.

A flowchart of such input processing action is illustrated in FIG. 3. When the basic programs of the BIOS (Basic Input/Output System) and OS (Operating System) are launched due to the main power supply of the mobile phone being engaged, the controller 15 loads an input processing program stored in the memory 14 and starts the process illustrated by the flowchart in FIG. 3 on the basis of the input processing program.

Although description will proceed hereinafter taking by way of example the case where a double-tap operation is conducted as the consecutive input operation, the case where a double-click operation is conducted as the consecutive input operation involves action similar to that described hereinafter. For this reason, reference to the following description is encouraged for action in the case where a double-click operation is conducted.

Also, description will proceed by taking the controller 15 to determine an input operation as a double-tap operation in the case where the first tap operation position and the second tap operation position are made within operation ranges of respectively predetermined sizes (conducted within an area of given size on the touch panel 5), and also made consecutively within the amount of time of a slow double-tap determining threshold value SL to be hereinafter described. It may also be configured such that in the case where the first tap operation position and the second tap operation position are outside the operation ranges of predetermined sizes, the controller 15 treats the tap operations as respective single-tap operations, or cancels the tap operations without accepting them.

Figure 2:
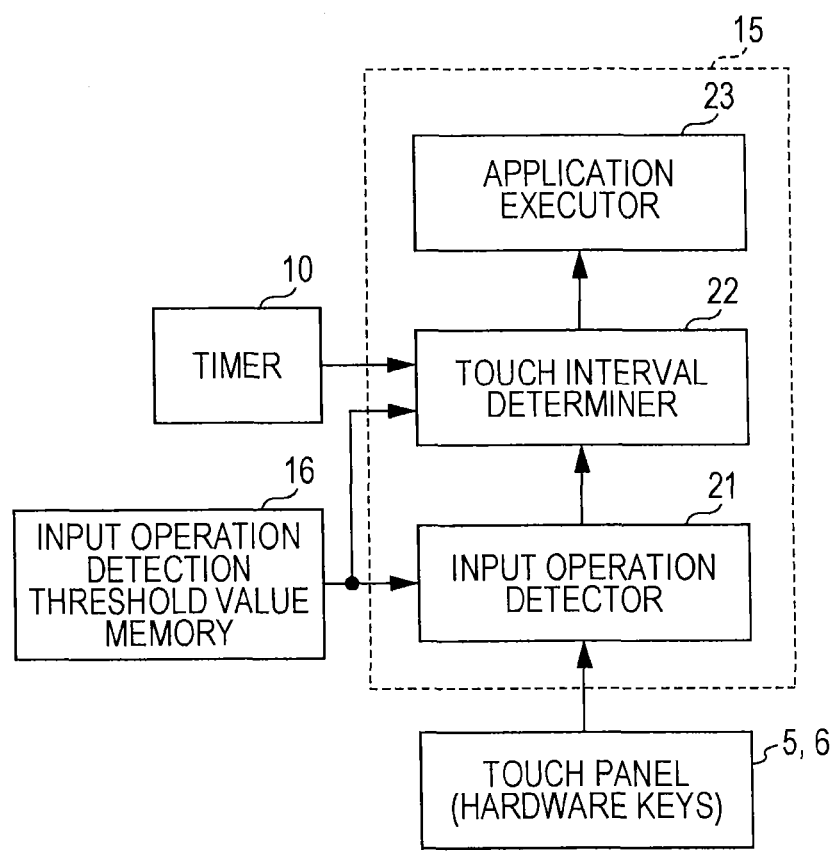
FIG. 2 is a function block diagram for the case of conducting input processing action in a mobile phone according to a first embodiment.

First, in step S1 of the flowchart in FIG. 3, the controller 15 functions as the input operation detector 21 illustrated in FIG. 2 to periodically monitor changes in the capacitance values detected by the capacitive sensors of the touch panel 5, and determines whether or not a first tap operation has been conducted by the user.

In other words, if a tap operation is performed by the user, the capacitances detected by the capacitive sensors at the place on the touch panel 5 corresponding to that tap operation will exhibit high values. For this reason, the controller 15 compares the capacitance values detected the capacitive sensors to a tap operation detection threshold value stored in the input operation detection threshold value memory 16, and in the case where a capacitance value equal to or greater than the tap operation detection threshold value is detected, determines that a first tap operation has been conducted by the user and advances the process to step S2.

In step S2, the controller 15 functions as the touch interval determiner 22 illustrated in FIG. 2 to acquire time information counted by the timer 10 and detect (identify) the first tap operation time t1, and advances the process to step S3.

In step S3, the controller 15 continues to function as the touch interval determiner 22 to determine, on the basis of the time information counted by the timer 10, whether or not the elapsed time since the first tap operation time t1 has passed the time of a slow double-tap determining threshold value SL.

In other words, it is configured such that a double-tap operation is determined to have been performed in the case where it is determined that first and second tap operations were conducted within a given range, and additionally, where it is determined that the amount of time from a time t1 when a first tap operation was conducted to a time t2 when a second tap operation was conducted is less than or equal to an amount of time indicated by a double-tap determining threshold value as illustrated in FIG. 4(a).

Also, it is configured such that the tap operation at the time t1 and the tap operation at the time t2 are determined to be respectively independent tap operation (single-tap operations) in the case where the amount of time from the time t1 when the first tap operation was conducted to the time t2 when the second tap operation was conducted exceeds the amount of time indicated by the double-tap determining threshold value as illustrated in FIG. 4(b).

Meanwhile, in the case of a mobile phone in this embodiment, consecutive input operations called double-tap operations are categorized into plural types of double-tap operations depending on the amount of time from when a first tap operation is conducted to when a second tap operation is conducted.

Specifically, although but an example, in the case of a mobile phone in this embodiment, a fast double-tap determining threshold value SH, a normal double-tap determining threshold value SM, and a slow double-tap determining threshold value SL as illustrated in FIGS. 5(a) to 5(d) are stored in the input operation detection threshold value memory 16 illustrated in FIGS. 1 and 2.

The determining threshold values SH, SM, and SL each express an amount of time from when a first tap operation is conducted to when a second tap operation is conducted (an operation interval). The normal double-tap determining threshold value SM expresses the operation interval for a double-tap operation at typical speed, and is set to 200 ms, for example.

Also, the fast double-tap determining threshold value SH expresses the temporal operation interval for a faster double-tap operation than the above double-tap operation at typical speed, and is set to 100 ms, for example. Also, the slow double-tap determining threshold value SL expresses the temporal operation interval for a slower double-tap operation than the above double-tap operation at typical speed, and is set to 500 ms, for example.

Described it in a little more detail, the determining threshold values SH, SM, and SL are set to values that reflect the user's intent during a double-tap operation.

For example, if the user conducts a double-tap operation in a normal state of mind, the amount of time corresponding to the temporal operation interval between a first tap operation and a second tap operation is approximately 150 ms to 180 ms.

For this reason, in a mobile phone of this embodiment, the above normal double-tap determining threshold value SM is set to 200 ms, and it is configured such that the user is determined to be in a normal state of mind and to have conducted a double-tap operation at typical speed in the case where the operation interval is "100 ms<operation interval≤200 ms".

In contrast, if the user conducts a double-tap operation in a hurry, the amount of time corresponding to the operation interval between a first tap operation and a second tap operation is approximately 80 ms to 90 ms.

For this reason, in a mobile phone of this embodiment, the above fast double-tap determining threshold value SH is set to 100 ms, and it is configured such that the user is determined to be in a hurry and to have conducted a fast double-tap operation in the case where the operation interval is "operation interval≤100 ms".

Also, if the user conducts a double-tap operation with plenty of time, the amount of time corresponding to the operation interval between a first tap operation and a second tap operation is approximately 250 ms to 480 ms.

For this reason, in a mobile phone of this embodiment, the above slow double-tap determining threshold value SL is set to 500 ms, and it is configured such that the user is determined to have plenty of time and to have conducted a slow double-tap operation in the case where the operation interval is "200 ms<operation interval≤500 ms".

Returning to the description of the processing in step S3 of the flowchart in the above FIG. 3, in step S3, in the case where the controller 15 functions as the touch interval determiner 22 and determines that the elapsed time since the first tap operation time t1 has passed the time of the above slow double-tap determining threshold value SL set to 500 ms, the controller 15 advances the process to step S10. Also, in step S3, in the case where the controller 15 functions as the touch interval determiner 22 and determines that the elapsed time since the first tap operation time t1 has not passed the time of the above slow double-tap determining threshold value SL set to 500 ms, the controller 15 advances the process to step S4.

Upon advancing the process to step S10 by determining that the operation interval (amount of time) from a first tap operation time t1 to a second tap operation time t2 has passed the time of the above slow double-tap determining threshold value SL set to 500 ms as illustrated in FIG. 5(d), the controller 15 recognizes that the first and second tap operations are single-tap operations for specifying respectively separate information processing (a double-tap operation is not established), returns the process to step S1, and again enters a standby state for detection of a first tap operation.

In contrast, upon advancing the process to step S4 by determining that the amount of time (operation interval) from a first tap operation time t1 to a second tap operation time t2 has not passed the time of the above slow double-tap determining threshold value SL, the controller 15 compares the capacitance values detected by the capacitive sensors of the touch panel 5 to a tap operation detection threshold value stored in the input operation detection threshold value memory 16, thereby determining whether or not a second tap operation has been conducted by the user. Then, the controller 15 advances the process to step S5 upon detecting the second tap operation after the first tap operation is detected but before the time of the above slow double-tap determining threshold value SL elapses.

In step S5, the controller 15 detects (identifies) the second tap operation time t2 on the basis of time information measured by the timer 10, and advances the process to step S6.

In step S6, the controller 15 determines whether or not the operation interval from the first tap operation time t1 to the second tap operation time t2 is less than or equal to the amount of time expressed by the fast double-tap determining threshold value SH stored in the input operation detection threshold value memory 16 as illustrated in FIG. 5(a) (t2−t1≤SH). Then, the controller 15 advances the process to step S11 in the case of determining that the above operation interval is less than or equal to the amount of time expressed by the above fast double-tap determining threshold value SH, and advances the process to step S7 in the case of determining that the above operation interval has exceeded the time expressed by the fast double-tap determining threshold value SH.

The above operation interval being less than or equal to the amount of time expressed by the fast double-tap determining threshold value SH means that the double-tap operation is a fast double-tap operation conducted by the user in a hurried state of mind. For this reason, in step S11, the controller 15 functions as the application executor 23 illustrated in FIG. 2, controls the execution of processing corresponding to the fast double-tap operation in the currently active application program, and returns the process to step S1.

In contrast, upon advancing the process to step S7 by determining that the above operation interval has exceeded the time expressed by the fast double-tap determining threshold value SH, the controller 15 determines whether or not the operation interval from the first tap operation time t1 to the second tap operation time t2 is less than or equal to the amount of time expressed by the normal double-tap determining threshold value SM stored in the input operation detection threshold value memory 16 as illustrated in FIG. 5(b) (SH<t2−t1≤SM).

Then, the controller 15 advances the process to step S12 in the case of determining that the above operation interval is less than or equal to the amount of time expressed by the normal double-tap determining threshold value SM, and advances the process to step S8 in the case of determining that the above operation interval has exceeded the time expressed by the normal double-tap determining threshold value SM.

The above operation interval being less than or equal to the amount of time expressed by the normal double-tap determining threshold value SM means that the double-tap operation is a double-tap operation at normal speed conducted by the user in an ordinary state of mind. For this reason, in step S12, the controller 15 functions as the application executor 23 illustrated in FIG. 2, controls the execution of processing corresponding to the normal double-tap operation in the currently active application program, and returns the process to step S1.

In contrast, upon advancing the process to step S8 by determining that the above operation interval has exceeded the time expressed by the normal double-tap determining threshold value SM, the controller 15 determines whether or not the operation interval from the first tap operation time t1 to the second tap operation time t2 is less than or equal to the amount of time expressed by the slow double-tap determining threshold value SL stored in the input operation detection threshold value memory 16 as illustrated in FIG. 5(c) (SM<t2−t1≤SL).

Then, the controller 15 advances the process to step S13 in the case of determining that the above operation interval is less than or equal to the amount of time expressed by the slow double-tap determining threshold value SL, and advances the process to step S9 in the case of determining that the above operation interval has exceeded the time expressed by the slow double-tap determining threshold value SL.

Upon advancing the process to step S13 by determining that the above operation interval is less than or equal to the amount of time expressed by the slow double-tap determining threshold value SL, the controller 15 functions as the application executor 23 illustrated in FIG. 2, controls the execution of processing corresponding to the slow double-tap operation in the currently active application program, and returns the process to step S1.

Also, upon advancing the process to step S9 by determining that the above operation interval has exceeded the time expressed by the slow double-tap determining threshold value SL, the controller 15 first functions as the application executor 23 to recognize the first tap operation which was detected before detecting the second tap operation as a single-tap operation and control the execution of processing corresponding to the single-tap operation in the currently active application program.

Also, in step S9, the controller 15 re-recognizes the second tap operation as a first tap operation, and returns the process to step S3. Thus, in the above step S4, the presence or absence of a second tap operation is monitored until the elapsed time since the time t1 of the re-recognized first tap operation exceeds the time expressed by the above slow double-tap determining threshold value SL. Also, in the above step S10, the re-recognized first tap operation is likewise processed as a single-tap operation in the case where the elapsed time since the time t1 of the above re-recognized first tap operation has exceeded the time expressed by the above slow double-tap determining threshold value SL.

[Information Processing According to Double-Tap Operation Type]

In a mobile phone of this embodiment, it is configured such that a total of three types of double-tap operations, a "fast double-tap operation", a "normal double-tap operation", and a "slow double-tap operation", are accepted as double-tap operations, as discussed above.

Information processing corresponding to the user's state of mind is assigned to the respective types of double-tap operations. For this reason, the controller 15 is able to execute information processing corresponding to the user's state of mind via respective types of double-tap operations.

(Information Processing in the Case of Performing a Double-Tap Operation on an Email Icon)

First, in the case of a mobile phone of this embodiment, the controller 15 displays icons for specifying the activation of various application programs on the touch panel 5, such as an icon for specifying the activation of an email management program, an icon for specifying the activation of a camera control program, and an icon for specifying the activation of a music player program, for example.

The user performs a double-tap operation on the display position of the icon corresponding to a desired application program from among icons displayed on the touch panel 5 in this way.

Figure 6A:
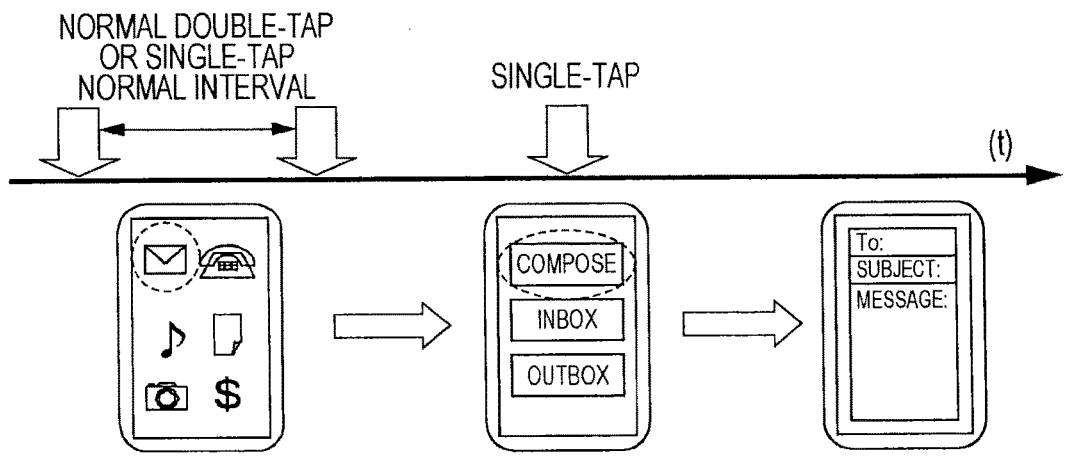
FIGS. 6A, 6B, and 6C are diagrams for explaining action in the case where a double-tap operation is performed on an email icon in a mobile phone according to a first embodiment.

In other words, although but an example, an icon for specifying the activation of an email management program is an icon with an envelope design as illustrated in FIG. 6(a).

As illustrated in FIG. 6(a), upon detecting that a normal double-tap operation (or a single-tap operation) has been performed on the display position of the icon for specifying the activation of an email management program, the controller 15 activates the email management program stored in the memory 14, and on the basis of this email management program, controls the display of various buttons on the touch panel 5, such as a compose button for specifying the display of a screen for composing a new email, an inbox button for specifying a list display of received emails, and an outbox button for specifying a list display of transmitted emails.

The various buttons are configured to be operated by single-tap operations. Upon detecting that a single-tap operation has been performed on the display position of the compose button, for example, the controller 15 controls the display of a screen for composing a new email on the touch panel 5.

Figure 6B:
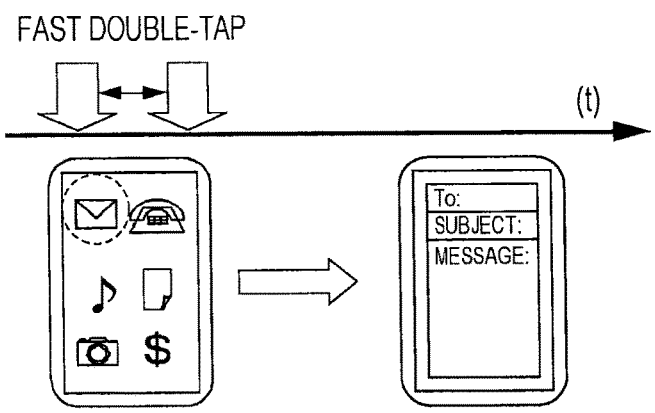

In contrast, as illustrated in FIG. 6(b), upon detecting that a fast double-tap operation has been performed on the display position of the icon for specifying the activation of an email management program, the controller 15 activates the email management program stored in the memory 14, and on the basis of this email management program, controls the display of a screen for composing a new email on the touch panel 5.

In other words, in the case where a normal double-tap operation is performed on the display position of the icon for specifying the activation of an email management program, the controller 15 displays various buttons such as the compose button and the inbox button as illustrated in FIG. 6(a), but in the case where a fast double-tap operation is performed, the controller 15 skips the action of displaying these various buttons and controls the display of a screen for composing a new email on the touch panel 5.

Figure 6C:
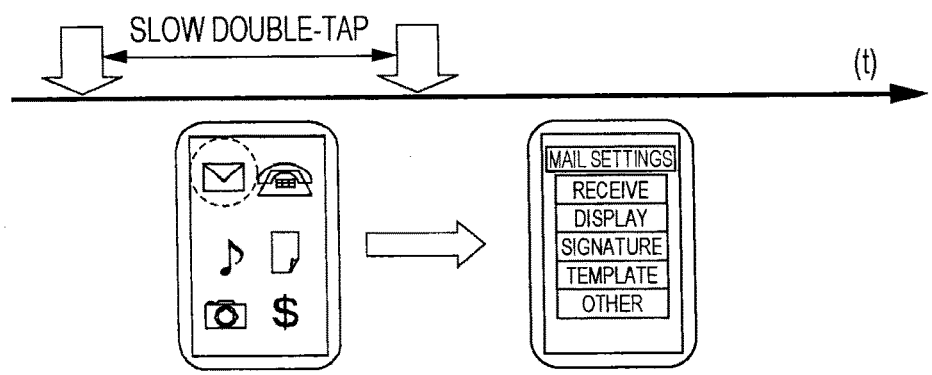

Also, as illustrated in FIG. 6(c), upon detecting that a slow double-tap operation has been performed on the display position of the icon for specifying the activation of an email management program, the controller 15 activates the email management program stored in the memory 14, and on the basis of this email management program, displays a mail settings screen for configuring various email settings on the touch panel 5. For this mail settings screen, the controller 15 displays various settings buttons such as a receive settings button for specifying email receive settings, a display settings button for specifying email display settings, and a template settings button for registering templates.

In other words, in the case where a normal double-tap operation is performed on the display position of the icon for specifying the activation of an email management program, the controller 15 displays various buttons such as the compose button and the inbox button as illustrated in FIG. 6(a), but in the case where a slow double-tap operation is performed, the controller 15 skips the action of displaying these various buttons and displays a mail settings screen for configuring various email settings on the touch panel 5.

Such action that changes information processing depending on the operation interval of a double-tap operation is action that reflects the user's state of mind.

Described specifically, when a normal double-tap operation is conducted, it can be determined that the user is in an ordinary state of mind and is not in much of a hurry. For this reason, in this case the controller 15 displays the various buttons and prompts selection of a desired action by the user.

In contrast, when a fast double-tap operation is conducted, it can be determined that the user is in a hurry. For this reason, in this case the controller 15 skips display of the various buttons and controls the display of a screen for composing a new email on the touch panel 5.

Also, when a slow double-tap operation is conducted, it can be determined that the user is operating the mobile phone with plenty of time. For this reason, in this case the controller 15 skips display of the various buttons and controls the display of a mail settings screen on the touch panel 5.

By changing the information processing depending on the temporal operation interval of a double-tap operation in this way, it becomes possible to execute processing that reflects the user's state of mind when conducting a double-tap operation.

(Information Processing in the Case of Performing a Double-Tap Operation on a Music Player Icon)

Figure 7A:
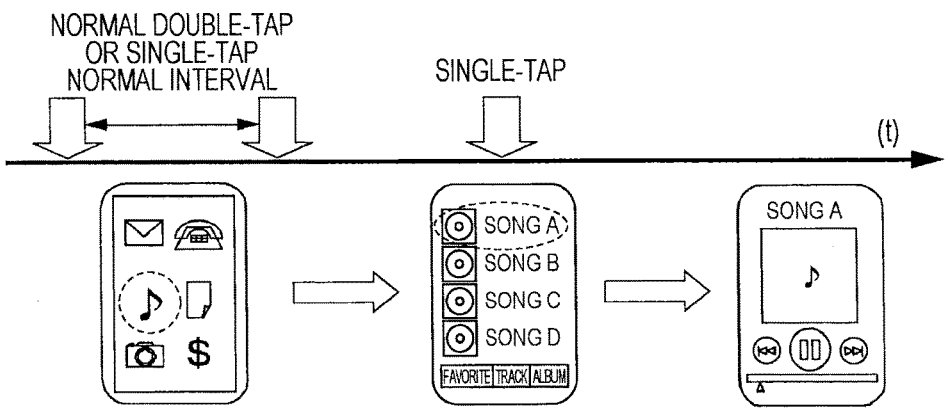
FIGS. 7A, 7B, 7C, and 7D are diagrams for explaining action in the case where a double-tap operation is performed on a music player icon in a mobile phone according to a first embodiment.
Figure 7B:
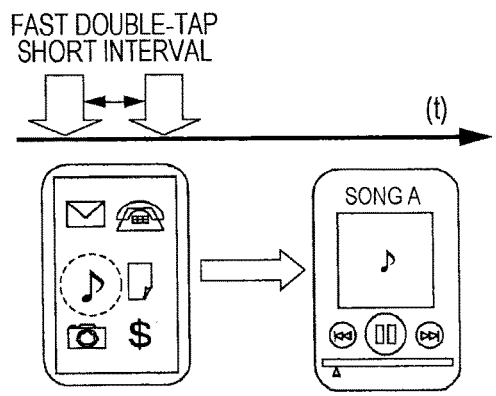
Figure 7C:
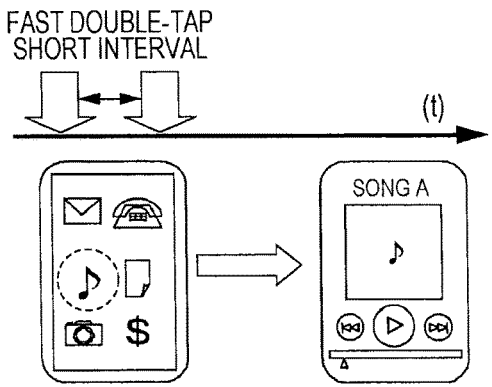
Figure 7D:
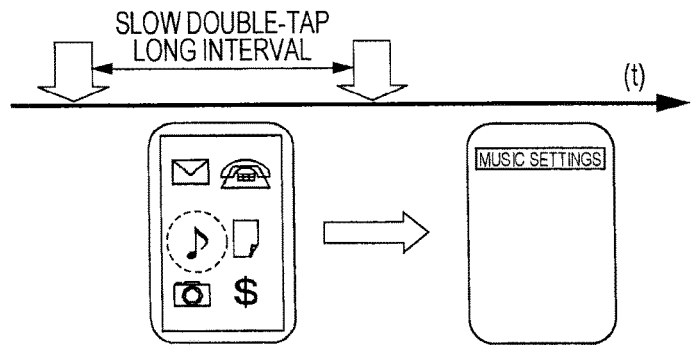

Next, an icon for specifying the activation of a music player program is an icon with a musical note design as illustrated in FIG. 7(a).

As illustrated in FIG. 7(a), upon detecting that a normal double-tap operation (or a single-tap operation) has been performed on the display position of the icon for specifying the activation of a music player program, the controller 15 activates the music player program stored in the memory 14, and on the basis of this music player program, controls the display of a list of music data stored in the memory 14 (song A, song B, song C, etc.) on the touch panel 5.

It is configured such that the user selects a desired song from this list and conducts a single-tap operation in the case of specifying playback of a song. Upon detecting that a single-tap operation has been performed on the display position of the song title for song A, for example, the controller 15 displays on the touch panel 5 a play/stop button for specifying playback and stopping of music, a fast-forward button and a rewind button for specifying the fast-forwarding and rewinding of music being played back, and a playback screen such as a progress display bar for displaying the playback progress corresponding to the current playback time as illustrated in FIG. 7(*a*), and in addition, reads out the music data of the song A from the memory 14 and starts playback.

Furthermore, it is configured such that when the fast-forward button is pressed and held down for a given amount of time or more, the controller 15 conducts fast-forward processing on the song currently being played back according to the duration of the press and hold operation, whereas when the fast-forward button is touched for an amount of time shorter than the given amount of time, the controller 15 skips to the next song to play back.

Similarly, it is configured such that when the rewind button is pressed and held down for a given amount of time or more, the controller 15 conducts rewind processing on the song currently being played back according to the duration of the press and hold operation, whereas when the rewind button is touched for an amount of time shorter than the given amount of time, the controller 15 skips to the previous song to play back.

Next, as illustrated in FIG. 7(*b*), upon detecting that a fast double-tap operation has been performed on the display position of the icon for specifying the activation of a music player program while in a state where music playback is not being conducted, the controller 15 activates the music player program stored in the memory 14, and on the basis of this music player program, starts playback of music data in order starting with the leading song.

In other words, if music data for respective songs is registered in the memory 14 in the order song A, song B, song C, etc., for example, then in this case the controller 15 starts playback of music data in order starting with the leading song, i.e., the song A.

In the case where a normal double-tap operation has been performed on the display position of the icon for specifying the activation of the above music player program, the controller 15 displays a screen listing respective songs as illustrated in FIG. 7(*a*) on the touch panel 5.

In contrast, in the case where the above fast double-tap operation has been performed on the display position of the icon for specifying the activation of the above music player program, the controller 15 skips the action of displaying a screen listing respective songs, displays the playback screen on the touch panel 5 as illustrated in FIG. 7(*b*), and starts playback of song starting with the leading song A.

Next, this mobile phone is configured such that the display screen on the touch panel 5 can be reverted back to the screen displaying icons of respective application programs by operating a hardware key 6 provided on the case of the mobile phone.

If a hardware key 6 is operated during the above song playback, the controller 15 reverts the display screen on the touch panel 5 back to the above screen displaying icons of respective application programs, while in a state where the song playback continues.

Additionally, as illustrated in FIG. 7(*c*), upon detecting that a fast double-tap operation has been performed on the display position of the icon for specifying the activation of a music player program in the case where a screen of respective application program icons is being displayed and also during song playback as above, the controller 15 displays the playback screen on the touch panel 5 on the basis of the active music player program, and in addition, stops playback of the song currently being played back.

Next, as illustrated in FIG. 7(*d*), upon detecting that a slow double-tap operation has been performed on the display position of the icon for specifying the activation of a music player program, the controller 15 activates the music player program stored in the memory 14, and on the basis of this music player program, displays a music settings screen for configuring various music player function settings on the touch panel 5.

In other words, in the case where a normal double-tap operation is performed on the display position of the icon for specifying the activation of a music player program, the controller 15 displays a screen listing respective songs on the touch panel 5 as illustrated in FIG. 7(*a*), but in the case where a slow double-tap operation is performed, the controller 15 skips the action of displaying this list screen and displays a music settings screen for configuring various music player function settings on the touch panel 5.

As discussed earlier, such action that changes information processing depending on the temporal operation interval of a double-tap operation is action that reflects the user's state of mind.

Described specifically, when a normal double-tap operation is conducted, it can be determined that the user is in an ordinary state of mind and is not in much of a hurry. For this reason, in this case the controller 15 displays the above screen listing respective songs on the touch panel 5 and prompts selection of a desired song by the user.

In contrast, when a fast double-tap operation is conducted, it can be determined that the user is in a hurry. For this reason, in this case the controller 15 skips display of the above screen listing respective songs and starts playback starting with the leading song A.

Also, when a slow double-tap operation is conducted, it can be determined that the user is operating the mobile phone with plenty of time. For this reason, in this case the controller 15 controls the display of a music settings screen on the touch panel 5 instead of the above screen listing respective songs.

By changing the information processing depending on the temporal operation interval of a double-tap operation in this way, it becomes possible to execute processing that reflects the user's state of mind when conducting a double-tap operation.

(Information Processing in the Case of Performing a Double-tap Operation on an Icon for Activating an Application Program List Screen)

Next, in the case of this mobile phone, it is configured such that the controller 15 displays a software key for specifying the display of a screen listing icons of application programs (an icon that activates an application program list screen) on a standby screen as illustrated in FIG. 8(*a*).

Although but an example, this icon that activates an application program list screen is shaped like a square overall, with a design in which the area inside the square is uniformly subdivided into nine square areas.

Figure 8A:
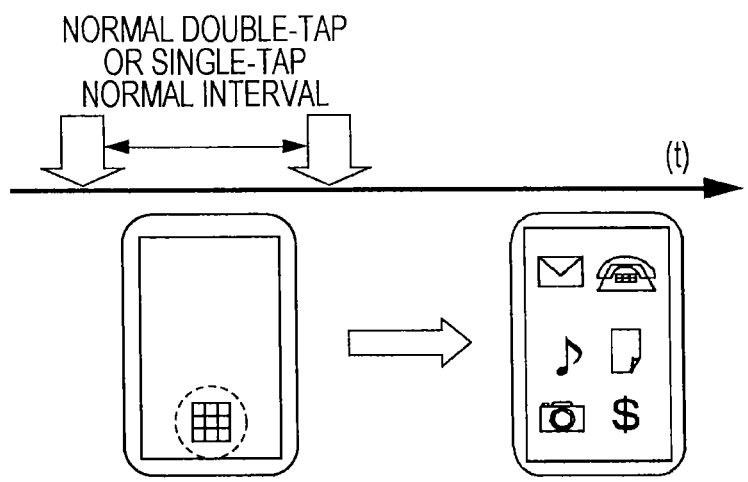
FIGS. 8A and 8B are diagrams for explaining action in the case where a double-tap operation is performed on an icon for activating an application program list screen in a mobile phone according to a first embodiment.

As illustrated in FIG. 8(a), upon detecting that a normal double-tap operation (or a single-tap operation) has been performed on the display position of the icon that activates an application program list screen while in a state where such a standby screen is being displayed on the touch panel 5, the controller 15 controls the display, on the touch panel 5, of a screen listing icons for specifying the activation of respective application programs, on the basis of the input processing program stored in the memory 14.

Figure 8B:
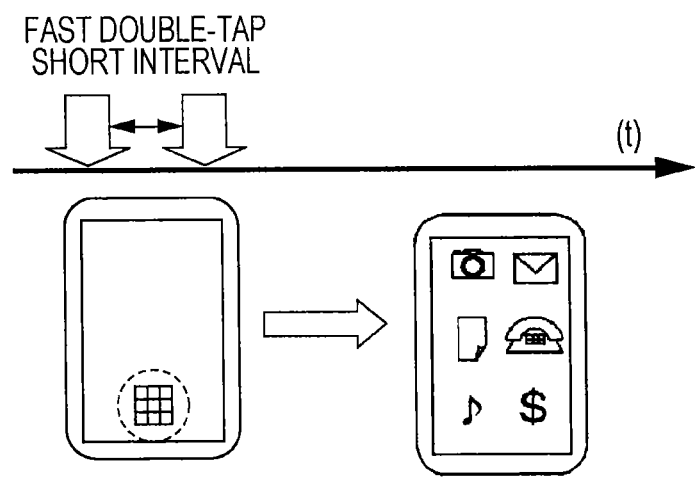

In contrast, as illustrated in FIG. 8(b), upon detecting that a fast double-tap operation has been performed on the display position of the icon that activates an application program list screen while in the above state where a standby screen is being displayed on the touch panel 5, the controller 15 applies control to sort the icons for specifying the activation of respective application programs in order of highest usage frequency and respectively display them on the touch panel 5, on the basis of the input processing program stored in the memory 14.

In other words, stored in the memory 14 is an activation count table that records the number of times each application program has been activated. Each time the controller 15 controls the activation of an application program, the controller 15 increments an activation count for the activated application program and registers it in the above activation count table.

Upon detecting that a fast double-tap operation has been performed on the display position of the icon that activates an application program list screen, the controller 15 references the activation count for each application program registered in the activation count table, and recognizes the usage frequency of each application program. Then, the controller 15 sorts and displays the icons for respective application programs on the touch panel 5 so as to be in order of highest usage frequency.

As discussed earlier, such action that changes information processing depending on the temporal operation interval of a double-tap operation is action that reflects the user's state of mind.

In other words, when a normal double-tap operation is conducted, it can be determined that the user is in an ordinary state of mind and is not in much of a hurry. For this reason, in this case the controller 15 displays on the touch panel 5 a list screen in which the above icons are sorted in a given order, such as in alphabetical order or in order by type, for example.

In contrast, when a fast double-tap operation is conducted, it can be determined that the user is in a hurry. For this reason, in this case the controller 15 displays on the touch panel 5 a list screen in which the above icons are sorted in order of highest usage frequency.

In so doing, icons for respective application programs can be displayed in order of highest probability of being activated by the user, and thus the icon for a desired application program can be found easily.

By changing the information processing depending on the temporal operation interval of a double-tap operation in this way, it becomes possible to execute processing that reflects the user's state of mind when conducting a double-tap operation.

(Information Processing in the Case of Performing a Double-tap Operation on a File Icon)

Figure 9A:
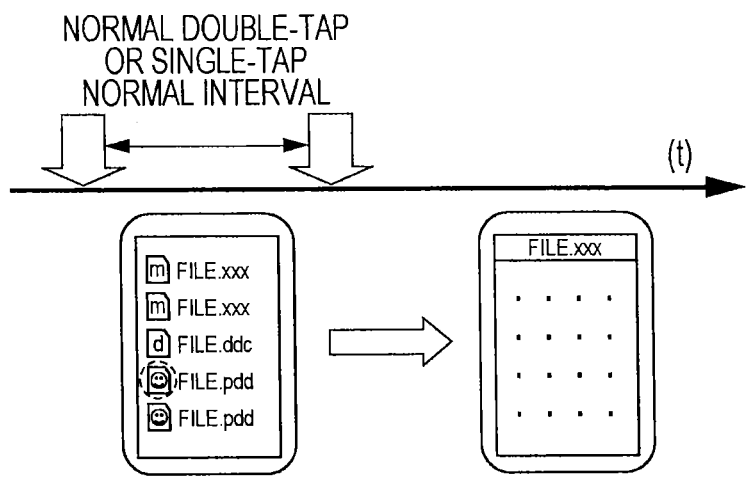
FIGS. 9A and 9B are diagrams for explaining action in the case where a double-tap operation is performed on a file icon in a mobile phone according to a first embodiment.

Next, in the case of displaying a list of files, this mobile phone is configured such that icons indicating the type of each file are displayed together with the file name of each file and the extension of each file, as illustrated in FIG. 9(a).

When specifying the display of a desired file, the user double-taps the icon of a desired file from this list.

As illustrated in FIG. 9(a), upon detecting on the basis of the input processing program stored in the memory 14 that a normal double-tap operation (or a single-tap operation) has been performed on the display position of the icon for a file, the controller 15 loads the application program corresponding to the file subjected to this normal double-tap operation from the memory 14 and activates it. The controller 15 then conducts information processing on the file subjected to the above normal double-tap operation on the basis of the activated application program, and controls its display on the touch panel 5.

Specifically, in the case where a normal double-tap operation is performed by the user on a file of still image data in JPEG format (JPEG: Joint Photographic Experts Group), for example, the controller 15 displays the still image data in JPEG format on the touch panel 5 on the basis of the viewer function of the camera control program stored in the memory 14.

In contrast, upon detecting on the basis of the input processing program stored in the memory 14 that a slow double-tap operation has been performed on the display position of the icon for a file, the controller 15 reads out additional information that has been added to the header, etc. of the file subjected to this slow double-tap operation from the memory 14.

Figure 9B:
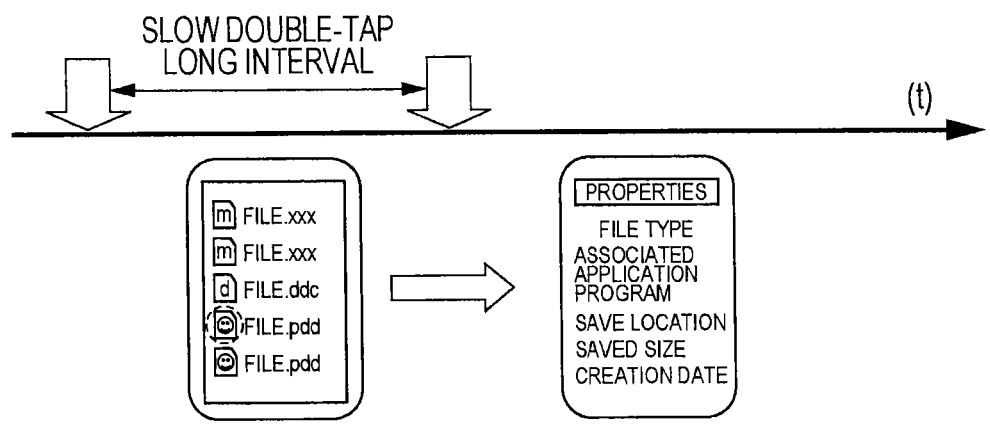

The file type, associated application program name, save location in the memory 14 of the mobile phone, saved size, and creation date, etc. is stored as the additional information. Upon reading out such additional information from the memory 14, the controller 15 displays it in list form on the touch panel 5, as illustrated in FIG. 9(b).

Specifically, in the case where a slow double-tap operation is performed by the user on a file of still image data in JPEG format, for example, the controller 15 loads additional information added to the header of the still image data, and displays it in list form on the touch panel 5, such as with JPEG data (file type), camera control program (associated application program name), memory 14 (save location in the memory 14 of the mobile phone), 174 KB (saved size), and 2011/12/1 (creation date).

As discussed earlier, such action that changes information processing depending on the temporal operation interval of a double-tap operation is action that reflects the user's state of mind.

In other words, when a normal double-tap operation is conducted, it can be determined that the user is in an ordinary state of mind. For this reason, in this case the controller 15 activates the application program for the file subjected to the above normal double-tap operation, and displays that file on the touch panel 5 on the basis of the activated application program.

Also, when a slow double-tap operation is conducted, it can be determined that the user has plenty of time. For this reason, in this case the controller 15 displays additional information for the file subjected to the above slow double-tap operation on the touch panel 5.

By changing the information processing depending on the temporal operation interval of a double-tap operation in this way, it becomes possible to execute processing that reflects the user's state of mind when conducting a double-tap operation.

(Information Processing in the Case of Performing a Double-Tap Operation on a Phone Icon)

Figure 10A:
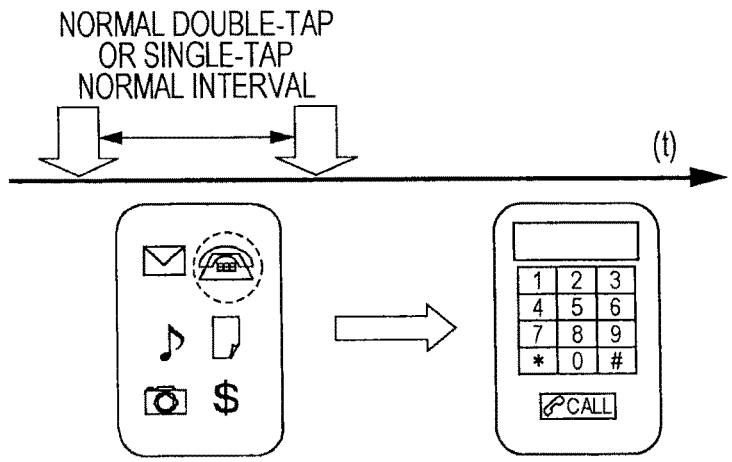
FIGS. 10A, 10B, and 10C are diagrams for explaining action in the case where a double-tap operation is performed on a phone icon in a mobile phone according to a first embodiment.

Next, an icon for specifying telephony is an icon with a telephone design, as illustrated in FIG. 10(a).

Figure 10B:
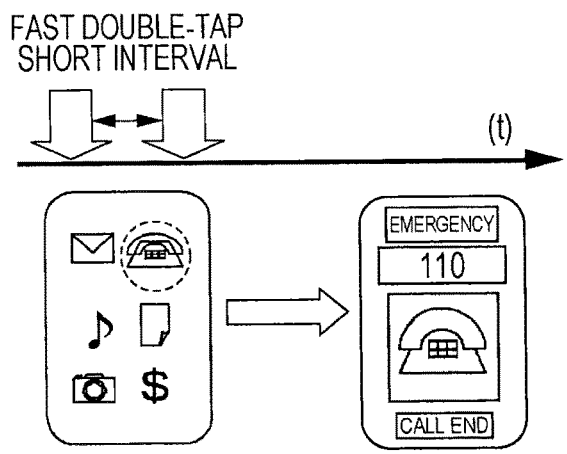
Figure 10C:
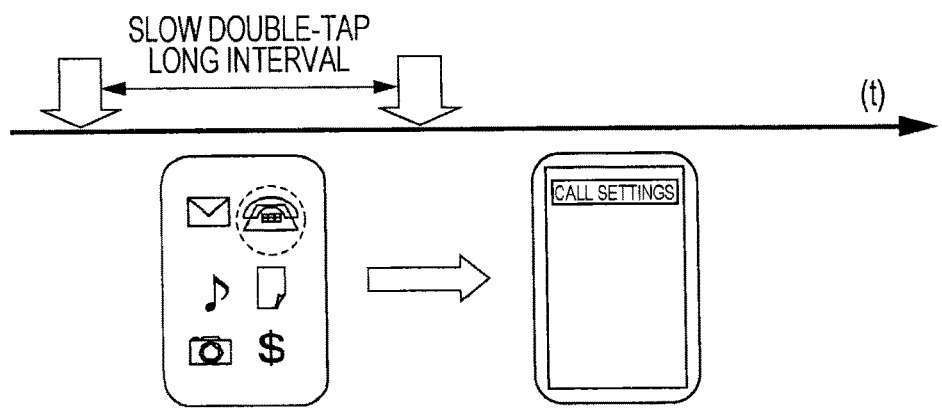

Upon detecting on the basis of the input processing program that a normal double-tap operation (or a single-tap operation) has been performed on the display position of the phone icon, the controller 15 controls the display on the touch panel 5 of a phone number input screen for inputting a desired phone number on the basis of the communication program stored in the memory 14, as illustrated in FIG. 10(*a*).

In contrast, upon detecting on the basis of the input processing program that a fast double-tap operation has been performed on the display position of the phone icon, the controller 15 controls the display on the touch panel 5 of phone call screen for times of emergency such as the police or fire department (emergency phone call screen) on the basis of the communication program stored in the memory 14, as illustrated in FIG. 10(*b*).

Although in this example an emergency phone call screen for the police or fire department, etc. is made to be displayed by performing a fast double-tap operation on the phone icon, but a call screen for the phone number of a close friend or relative, for example, may also be displayed thereby. In this case, the phone number of the close friend or relative is registered in the memory 14 in advance as the phone number to call in times of emergency. Then, the controller 15 displays a call screen for the phone number registered in the memory 14 on the touch panel 5 once a fast double-tap operation on the phone icon is detected.

When such an emergency phone call screen is displayed, the controller 15 enters a call operation standby state, and controls the calling of the phone number once a call operation is performed by the user.

However, since it is a time of emergency, the controller 15 may display the above emergency phone call screen and also immediately control the calling of the phone number rather than waiting for the above call operation.

Next, upon detecting on the basis of the input processing program that a slow double-tap operation has been performed on the display position of the phone icon, the controller 15 controls the display on the touch panel 5 of a call settings screen for configuring various phone settings, as illustrated in FIG. 10(*c*).

Such action that changes information processing depending on the temporal operation interval of a double-tap operation is action that reflects the user's state of mind.

Described specifically, when a normal double-tap operation is conducted, it can be determined that the user is in an ordinary state of mind and is not in much of a hurry. For this reason, in this case the controller 15 displays a screen for inputting a desired phone number as illustrated in FIG. 10(*a*).

In contrast, when a fast double-tap operation is conducted, it can be determined that the user is in a hurry. For this reason, in this case the controller 15 controls the display on the touch panel 5 of the above emergency phone call screen as illustrated in FIG. 10(*b*).

Also, when a slow double-tap operation is conducted, it can be determined that the user is operating the mobile phone with plenty of time. For this reason, in this case the controller 15 controls the display on the touch panel 5 of the above call settings screen as illustrated in FIG. 10(*c*).

By changing the information processing depending on the temporal operation interval of a double-tap operation in this way, it becomes possible to execute processing that reflects the user's state of mind when conducting a double-tap operation.

(Information Processing in the Case of Performing a Double-tap Operation on a Calendar Icon)

Figure 11A:
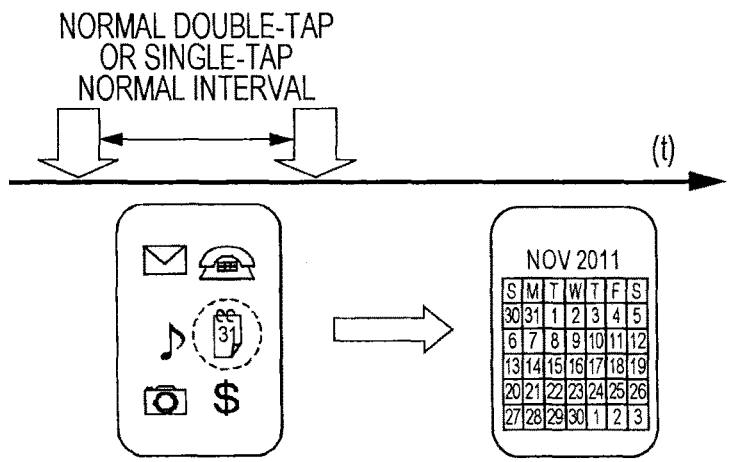
FIGS. 11A, 11B, and 11C are diagrams for explaining action in the case where a double-tap operation is performed on a calendar icon in a mobile phone according to a first embodiment.
Figure 11B:
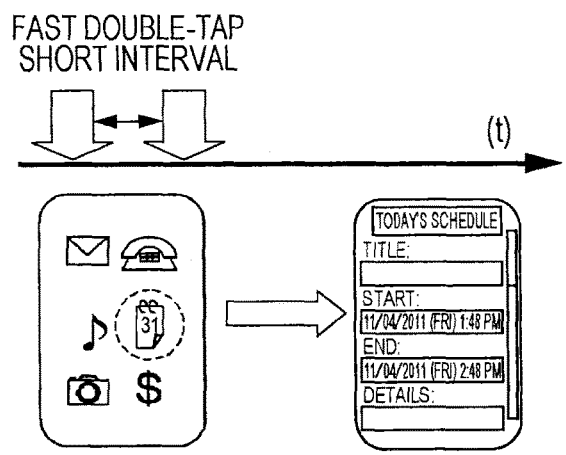
Figure 11C:
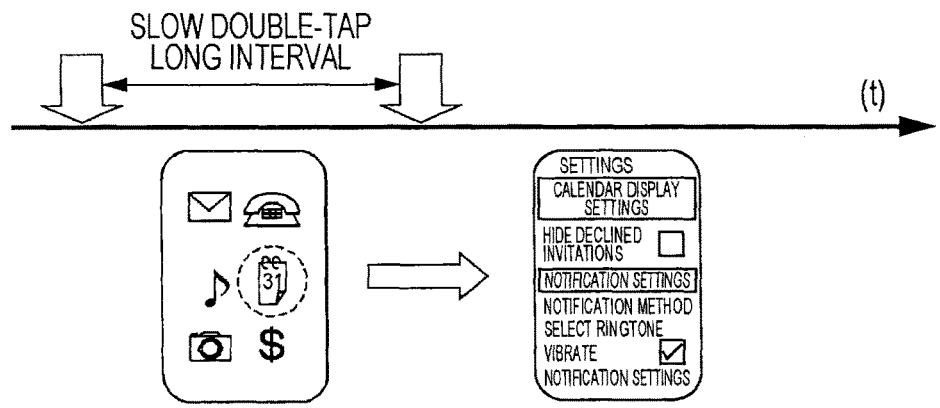

Next, an icon for specifying the display of a calendar is an icon with a design having the appearance of a wall calendar, as illustrated in FIG. 11(*a*).

Upon detecting on the basis of the input processing program that a normal double-tap operation (or a single-tap operation) has been performed on the display position of the calendar icon, the controller 15 controls the display on the touch panel 5 of a calendar image for the month to which today belongs on the basis of the scheduler management program stored in the memory 14, as illustrated in FIG. 11(*a*). For example, the controller 15 displays a calendar for December 2011 on the touch panel 5 in the case where the date when the normal double-tap operation is performed is Dec. 1, 2011.

Upon detecting on the basis of the input processing program that a fast double-tap operation has been performed on the display position of the calendar icon, the controller 15 controls the display on the touch panel 5 of a schedule input screen for today on the basis of the scheduler management program stored in the memory 14, as illustrated in FIG. 11(*b*). For example, the controller 15 displays a schedule input screen for Dec. 1, 2011 on the touch panel 5 in the case where the date when the fast double-tap operation is performed is Dec. 1, 2011.

Also, upon detecting on the basis of the input processing program that a slow double-tap operation has been performed on the display position of the calendar icon, the controller 15 controls the display on the touch panel 5 of a settings screen for configuring calendar display settings and schedule notification settings, as illustrated in FIG. 11(*c*).

Such action that changes information processing depending on the temporal operation interval of a double-tap operation is action that reflects the user's state of mind.

Described specifically, when a normal double-tap operation is conducted, it can be determined that the user is in an ordinary state of mind and is not in much of a hurry. For this reason, in this case the controller 15 displays a calendar of the month to which today belongs on the touch panel 5, as illustrated in FIG. 11(*a*).

In contrast, when a fast double-tap operation is conducted, it can be determined that the user is in a hurry. In the case of inputting a schedule with this mobile phone, a desired date is selected from the calendar. When a desired date is selected from the calendar, the controller 15 displays a schedule input screen for the selected date.

However, in the case where a fast double-tap operation is conducted, the action of displaying the calendar is skipped, and a schedule input screen for the date subjected to the fast double-tap operation is displayed.

Also, when a slow double-tap operation is conducted, it can be determined that the user is operating the mobile phone with plenty of time. For this reason, in this case the controller 15 controls the display on the touch panel 5 of a settings screen for configuring calendar display settings and schedule notification settings, as illustrated in FIG. 11(*c*).

By changing the information processing depending on the temporal operation interval of a double-tap operation in this way, it becomes possible to execute processing that reflects the user's state of mind when conducting a double-tap operation.

(Information Processing in the Case of Performing a Double-tap Operation on a Web Browser Icon)

Figure 12A:
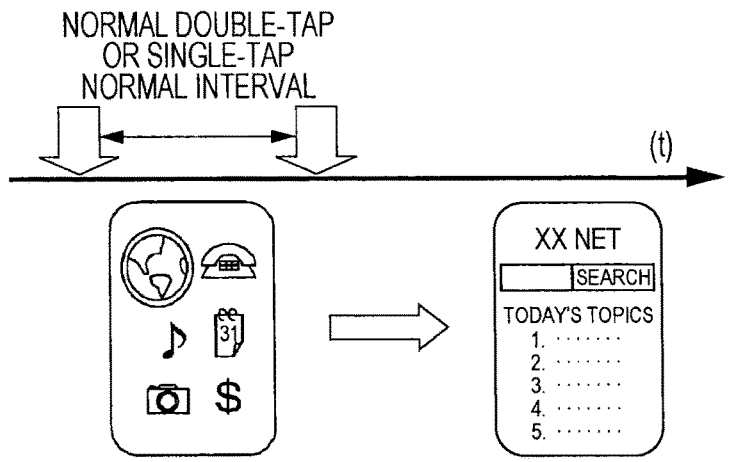
FIGS. 12A, 12B, and 12C are diagrams for explaining action in the case where a double-tap operation is performed on a web browser icon in a mobile phone according to a first embodiment.
Figure 12B:
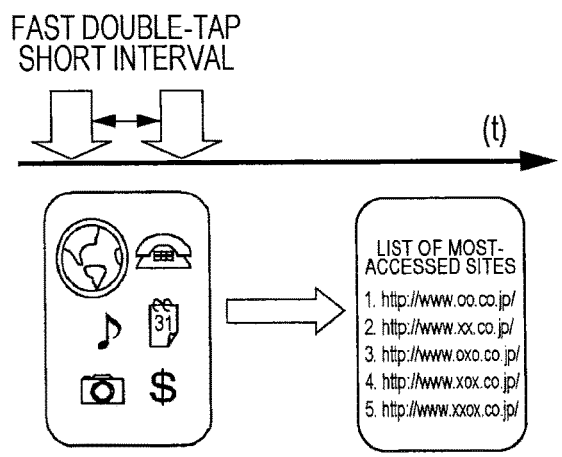
Figure 12C:
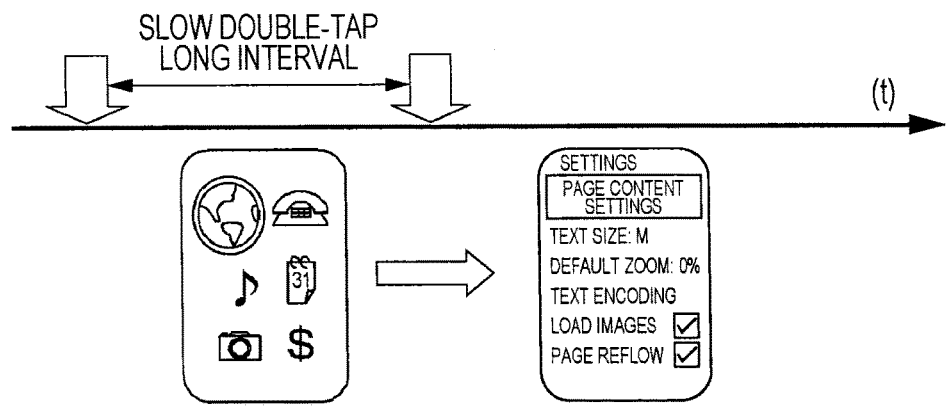

Next, an icon for specifying the activation of a web browser is an icon with a design having the appearance of the Earth, as illustrated in FIG. 12(*a*).

Upon detecting on the basis of the input processing program that a normal double-tap operation (or a single-tap operation) has been performed on the display position of the web browser icon, the controller 15 accesses a web site registered by the user in advance as a web page to be accessed when activating the web browser and controls the display on the touch panel 5 of a web screen for that web site on the basis of the web browsing program stored in the memory 14, as illustrated in FIG. 12(*a*), for example.

In other words, in this case the user registers the addresses of a desired web site. The controller 15 saves the registered web site address in the memory 14. Then, when a normal double-tap operation is performed on the web browser icon, the controller 15, on the basis of the address registered in the memory 14, acquires a web screen of the front page from the web site corresponding the address, and displays it on the touch panel 5.

In contrast, upon detecting on the basis of input processing program that a fast double-tap operation has been performed on the display position of the web browser icon, the controller 15 displays a list of the site names of the most-accessed web sites on the touch panel 5.

In other words, in this case the mobile phone includes a view count table in the memory 14 that indicates the number of times respective web sites have been viewed. Each time the user views a web site, the controller 15 increments the view count corresponding to that web site by 1 in the above view count table. Thus, information indicating the previous number of times each web site has been viewed can be stored in a view count table.

Upon detecting that a fast double-tap operation has been performed on the display position of the web browser icon, the controller 15 references the above view count table and detects the site names of web sites in order of highest access count. Then, the detected site names of web sites are sorted in order of highest access and listed on the touch panel 5.

Also, upon detecting on the basis of the input processing program that a slow double-tap operation has been performed on the display position of the web browser icon, the controller 15 controls the display on the touch panel 5 of a settings screen for configuring text size settings when displaying a web page and a setting for whether or not to load and display images on that web page, etc., as illustrated in FIG. 12(*c*).

Such action that changes information processing depending on the temporal operation interval of a double-tap operation is action that reflects the user's state of mind.

Described specifically, when a normal double-tap operation is conducted, it can be determined that the user is in an ordinary state of mind and is not in much of a hurry. For this reason, in this case the controller 15 displays the web page of a web site registered in advance on the touch panel 5, as illustrated in FIG. 12(*a*).

In contrast, when a fast double-tap operation is conducted, it can be determined that the user is in a hurry, and it is preferable for the user to be able to access a desired web site as quickly as possible.

For this reason, the controller 15 displays the site names of web sites with the highest access counts from among previously accessed web sites in order on the touch panel 5, as illustrated in FIG. 12(*b*). Thus, a desired web site can be found easily, and it becomes possible to more rapidly access the user's desired web site.

Also, when a slow double-tap operation is conducted, it can be determined that the user is operating the mobile phone with plenty of time. For this reason, in this case the controller 15 controls the display on the touch panel 5 of a settings screen for configuring text size settings when displaying a web page and a setting for whether or not to load and display images on that web page, etc., as illustrated in FIG. 12(*c*).

By changing the information processing depending on the temporal operation interval of a double-tap operation in this way, it becomes possible to execute processing that reflects the user's state of mind when conducting a double-tap operation.

(Information Processing in the Case of Performing a Double-tap Operation on a Map Icon)

Next, an icon for specifying the display of a map is an icon with a rolled map design, as illustrated in FIG. 13(*a*).

Upon detecting on the basis of the input processing program that a normal double-tap operation (or a single-tap operation) has been performed on the display position of the map icon, the controller 15 displays on the touch panel 5 a screen for selecting a map to display on the basis of a map display control program stored in the memory 14, as illustrated in FIG. 13(*a*).

On the basis of this map selection screen, the user gradually narrows down a geographical range, and ultimately specifies a desired geographical range with a block or area. The controller 15 reads out map information for the specified geographical range from map information stored in the memory 14 and displays it on the touch panel 5.

Alternatively, the controller 15 accesses the server of a web site delivering map information, acquires map information for the specified geographical range from this server, and displays it on the touch panel 5.

Although in this example a map selection screen is made to be displayed in the case where a normal double-tap operation is performed on the display position of a map icon, the map image that was being displayed when the map display control program was terminated previously may also be displayed on the touch panel 5. Alternatively, a map image of a given location stored in advance in the memory 14 as a default may be displayed on the touch panel 5.

In contrast, upon detecting on the basis of the input processing program that a fast double-tap operation has been performed on the display position of the map icon, the controller 15 activates the GPS unit 13 and acquires information on the present location of the mobile phone (latitude information and longitude information). Then, the controller 15 reads out map information for a given geographical range centered about the present location information from the memory 14 and displays it on the touch panel 5, as illustrated in FIG. 13(*b*).

Alternatively, the controller 15 accesses the server of a web site delivering map information, acquires map information for a given geographical range centered about the present location from this server, and displays it on the touch panel 5.

Also, upon detecting on the basis of the input processing program that a slow double-tap operation has been performed on the display position of the map icon, the controller 15 controls the display on the touch panel 5 of a settings screen for configuring the default size when displaying a map and settings regarding places to display, as illustrated in FIG. 13(*c*).

Such action that changes information processing depending on the temporal operation interval of a double-tap operation is action that reflects the user's state of mind.

Figure 13A:
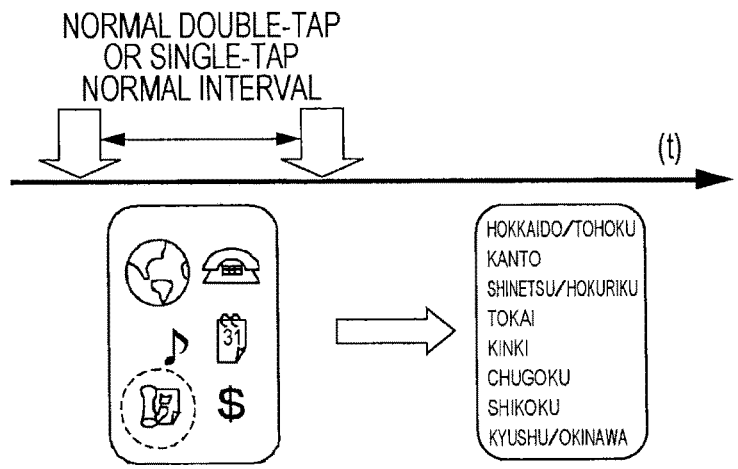
FIGS. 13A, 13B, and 13C are diagrams for explaining action in the case where a double-tap operation is performed on a map icon in a mobile phone according to a first embodiment.

Described specifically, when a normal double-tap operation is conducted, it can be determined that the user is in an ordinary state of mind and is not in much of a hurry. For this reason, in this case the controller 15 displays on the touch panel 5 a selection screen for selecting a desired geographical range, as illustrated in FIG. 13(a).

Figure 13B:
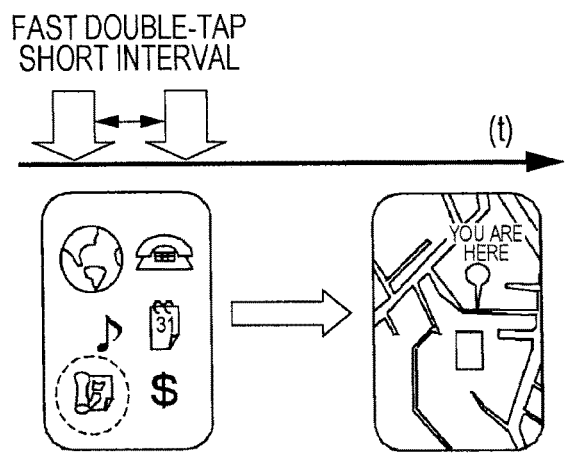

In contrast, when a fast double-tap operation is conducted, it can be determined that the user is in a hurry. For this reason, the controller 15 displays on the touch panel 5 map information for a given geographical range that includes the present location, as illustrated in FIG. 13(b).

Figure 13C:
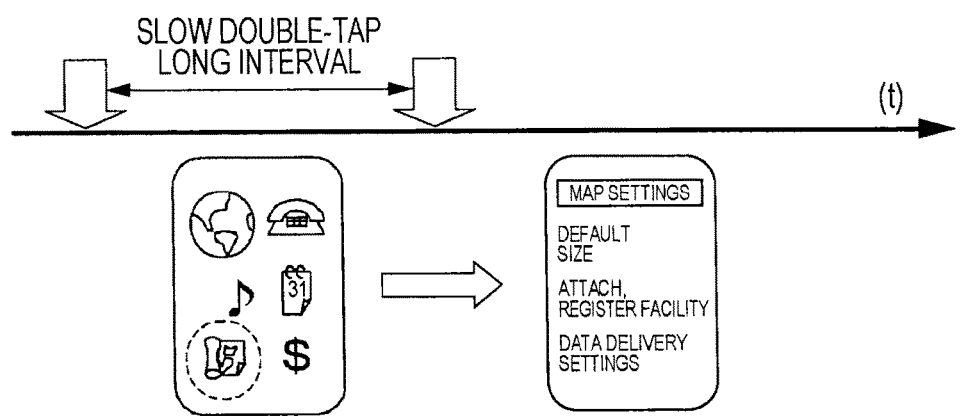

Also, when a slow double-tap operation is conducted, it can be determined that the user is operating the mobile phone with plenty of time. For this reason, in this case the controller 15 controls the display on the touch panel 5 of a settings screen for configuring map display settings, as illustrated in FIG. 13(c).

By changing the information processing depending on the temporal operation interval of a double-tap operation in this way, it becomes possible to execute processing that reflects the user's state of mind when conducting a double-tap operation.

(Information Processing in the Case of Performing a Double-tap Operation on a Notepad Icon)

Figure 14A:
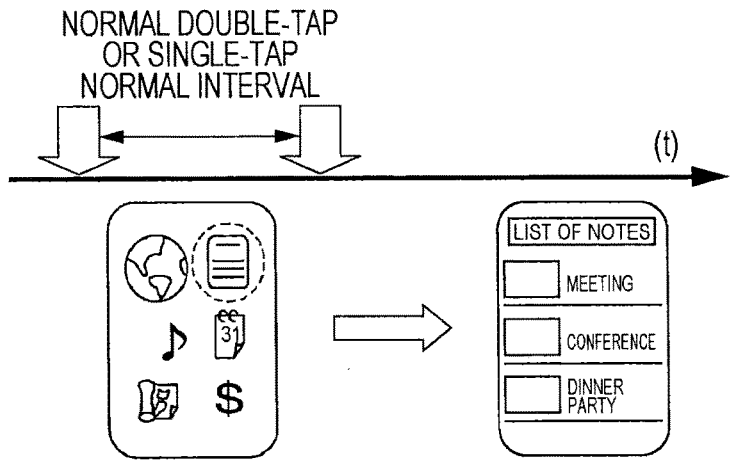
FIGS. 14A, 14B, and 14C are diagrams for explaining action in the case where a double-tap operation is performed on a notepad icon in a mobile phone according to a first embodiment.

Next, an icon for specifying the display of a notepad is an icon with a notebook design, as illustrated in FIG. 14(a).

Upon detecting on the basis of the input processing program that a normal double-tap operation (or a single-tap operation) has been performed on the display position of the notebook icon, the controller 15 displays on the touch panel 5 a list of note information registered in the memory 14 by the user on the basis of the notepad application program stored in the memory 14, as illustrated in FIG. 14(a).

Figure 14B:
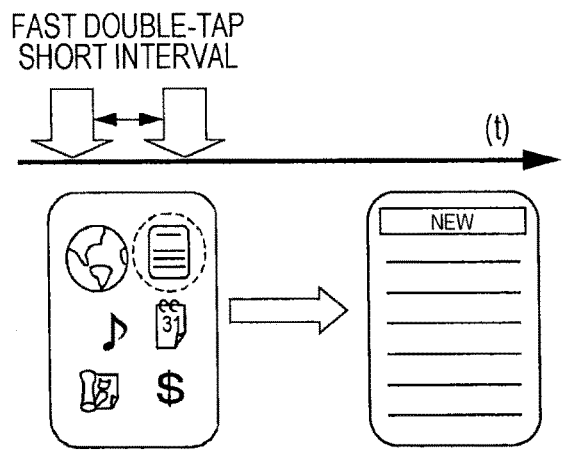

In contrast, upon detecting on the basis of the input processing program that a fast double-tap operation has been performed on the display position of the notepad icon, the controller 15 displays on the touch panel 5 a create new screen for inputting new note information on the basis of the notepad application program, as illustrated in FIG. 14(b).

Figure 14C:
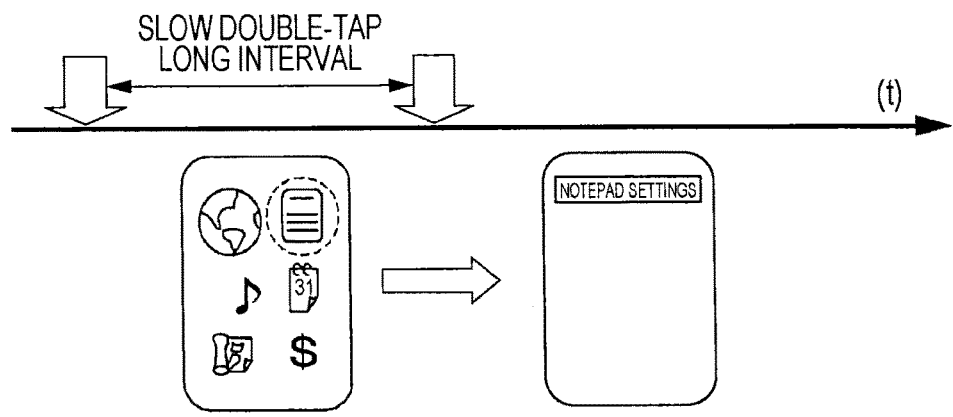

In contrast, upon detecting on the basis of the input processing program that a slow double-tap operation has been performed on the display position of the notepad icon, the controller 15 controls the display on the touch panel 5 of a settings screen for configuring notepad settings on the basis of the notepad application program, as illustrated in FIG. 14(c).

Such action that changes information processing depending on the temporal operation interval of a double-tap operation is action that reflects the user's state of mind.

Described specifically, when a normal double-tap operation is conducted, it can be determined that the user is in an ordinary state of mind and is not in much of a hurry. For this reason, in this case the controller 15 displays on the touch panel 5 a list of previously registered notes, as illustrated in FIG. 14(a).

In contrast, when a fast double-tap operation is conducted, it can be determined that the user is in a hurry. For this reason, the controller 15 displays on the touch panel 5 a create new screen for inputting new note information, as illustrated in FIG. 14(b).

Also, when a slow double-tap operation is conducted, it can be determined that the user is operating the mobile phone with plenty of time. For this reason, in this case the controller 15 controls the display on the touch panel 5 of a settings screen for configuring notepad settings, as illustrated in FIG. 14(c).

By changing the information processing depending on the temporal operation interval of a double-tap operation in this way, it becomes possible to execute processing that reflects the user's state of mind when conducting a double-tap operation.

(Information Processing in the Case of Performing a Double-tap Operation on a Game Icon)

Figure 15A:
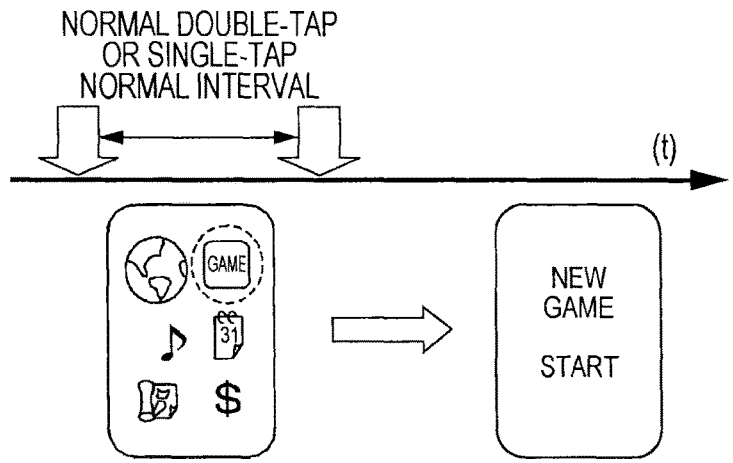
FIGS. 15A, 15B, and 15C are diagrams for explaining action in the case where a double-tap operation is performed on a game icon in a mobile phone according to a first embodiment.

Next, an icon for specifying the activation of a game application program is an icon with the text "GAME" written upon it, as illustrated in FIG. 15(a).

Upon detecting on the basis of the input processing program that a normal double-tap operation (or a single-tap operation) has been performed on the display position of the game icon, the controller 15 displays on the touch panel 5 the start screen for that game on the basis of a game application stored in the memory 14, causing a new game to be started in accordance with subsequent user operations, as illustrated in FIG. 15(a).

Figure 15B:
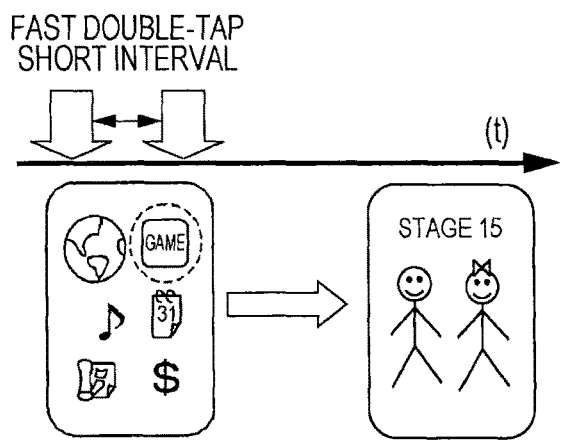

In contrast, upon detecting on the basis of the input processing program that a fast double-tap operation has been performed on the display position of the game icon, the controller 15 displays on the touch panel 5 a screen of the game stage where the game was last saved during play, as illustrated in FIG. 15(b).

In other words, if a save operation is performed by the user during execution of the game application program, the controller 15 saves information in the memory 14 indicating the game stage where this save operation was performed. Then, upon detecting that a fast double-tap operation has been performed on the display position of the above game icon, the controller 15 reads out the above information indicating a game stage that was saved in the memory 14, and displays on the touch panel 5 a game screen corresponding to the information indicating a game stage.

Figure 15C:
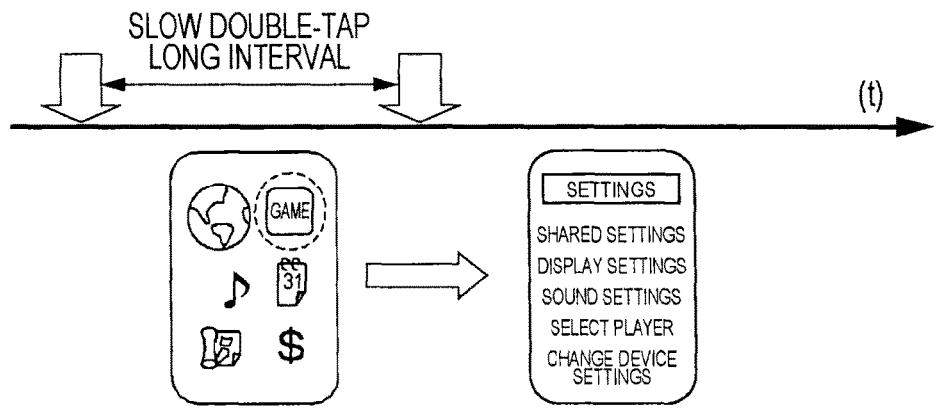

Also, upon detecting on the basis of the input processing program that a slow double-tap operation has been performed on the display position of the game icon, the controller 15 controls the display on the touch panel 5 of a settings screen for configuring the screen display and sound output, etc. of that game on the basis of the game application program, as illustrated in FIG. 15(c).

Such action that changes information processing depending on the temporal operation interval of a double-tap operation is action that reflects the user's state of mind.

Described specifically, when a normal double-tap operation is conducted, it can be determined that the user is in an ordinary state of mind and is not in much of a hurry. For this reason, in this case the controller 15 displays on the touch panel 5 the start screen for that game, as illustrated in FIG. 15(a).

In contrast, when a fast double-tap operation is conducted, it can be determined that the user is in a hurry. For this reason, the controller 15 displays on the touch panel 5 a game screen of the last saved game stage, as illustrated in FIG. 15(b).

Also, when a slow double-tap operation is conducted, it can be determined that the user is operating the mobile phone with plenty of time. For this reason, in this case the controller 15 controls the display on the touch panel 5 of a settings screen for configuring various game settings, as illustrated in FIG. 15(c).

By changing the information processing depending on the temporal operation interval of a double-tap operation in this way, it becomes possible to execute processing that reflects the user's state of mind when conducting a double-tap operation.

[Advantages of First Embodiment]

As is apparent from the above description, a mobile phone according to a first embodiment is configured to accept plural types of double-tap operations depending on the amount of time from a first tap operation to a next tap operation in a double-tap operation on the touch panel 5 (temporal tap operation interval).

In other words, as an example, a normal double-tap operation whose temporal interval between tap operations is an interval given to be normal, a fast double-tap operation whose temporal interval between tap operations is a shorter interval than the interval given to be normal, and a slow double-tap operation whose temporal interval between tap operations is a longer interval than the interval given to be normal, are accepted. Additionally, respectively different information processing is executed in correspondence with these types of double-tap operations.

Thus, since a single double-tap operation can be separately utilized as three types of double-tap operations, for example, improvement in the usability of the mobile phone can be attempted.

Also, there is associated information processing that matches the user's intent as anticipated from the temporal interval between tap operations, such as displaying the main screen of an application program if a normal double-tap operation is conducted, but skipping the display of the main screen of the application program and immediately displaying an input screen if a fast double-tap operation is conducted, for example.

For this reason, a connection can be made between the implications of double-tap operations with respective temporal intervals and the user's intent when conducting double-tap operations with such temporal intervals (information processing intended by the user), and the user is able to conduct intuitive input operations.

[Second Embodiment]

Next, a mobile phone according to a second embodiment will be described.

A mobile phone of the first embodiment discussed above executed respectively different information processing depending on the temporal interval of a double-tap operation. In contrast, a mobile phone of the second embodiment is configured to execute respectively different information processing depending on the temporal interval of a double-tap operation as well as the position of the double-tap operation.

Figure 16:
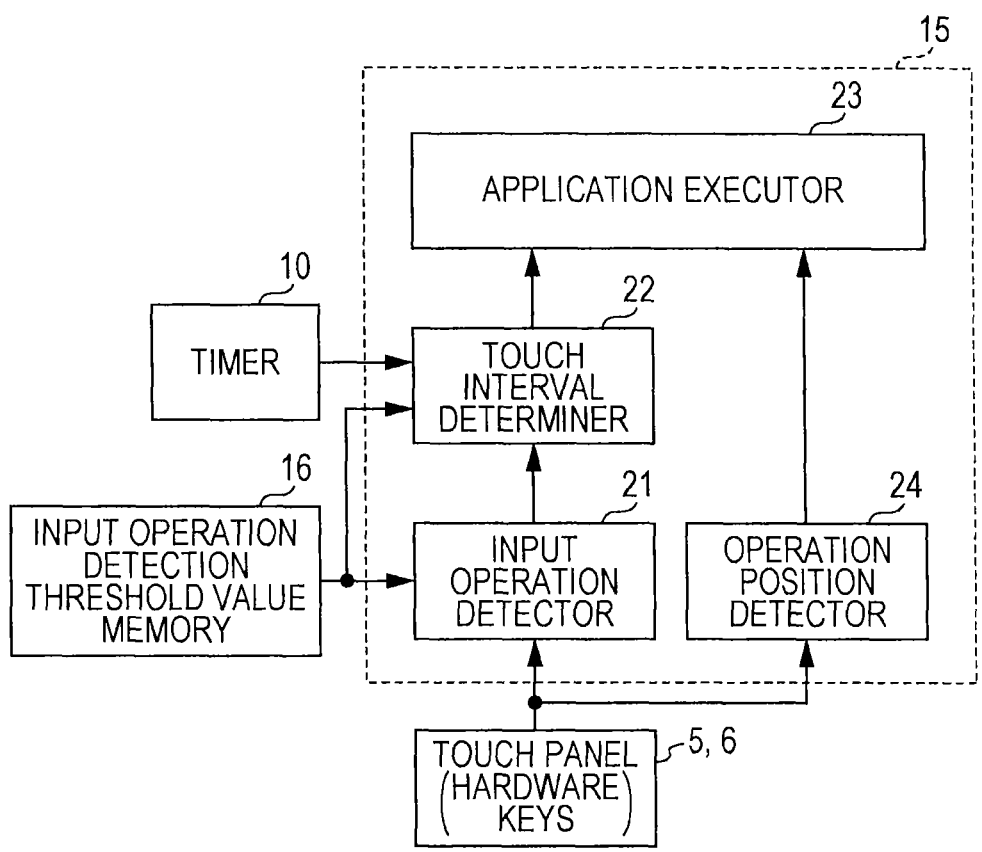
FIG. 16 is a function block diagram for the case of conducting input processing action in a mobile phone according to a second embodiment.

In the case of a mobile phone of the second embodiment, the controller 15 acts on the basis of an input processing program stored in the memory 14 to function as an input operation detector 21, a touch interval determiner 22, and an application executor 23, as well as an operation position detector 24 that detects the position of a double-tap operation on the touch panel 5, which are illustrated enclosed by broken lines in FIG. 16.

Figure 17:
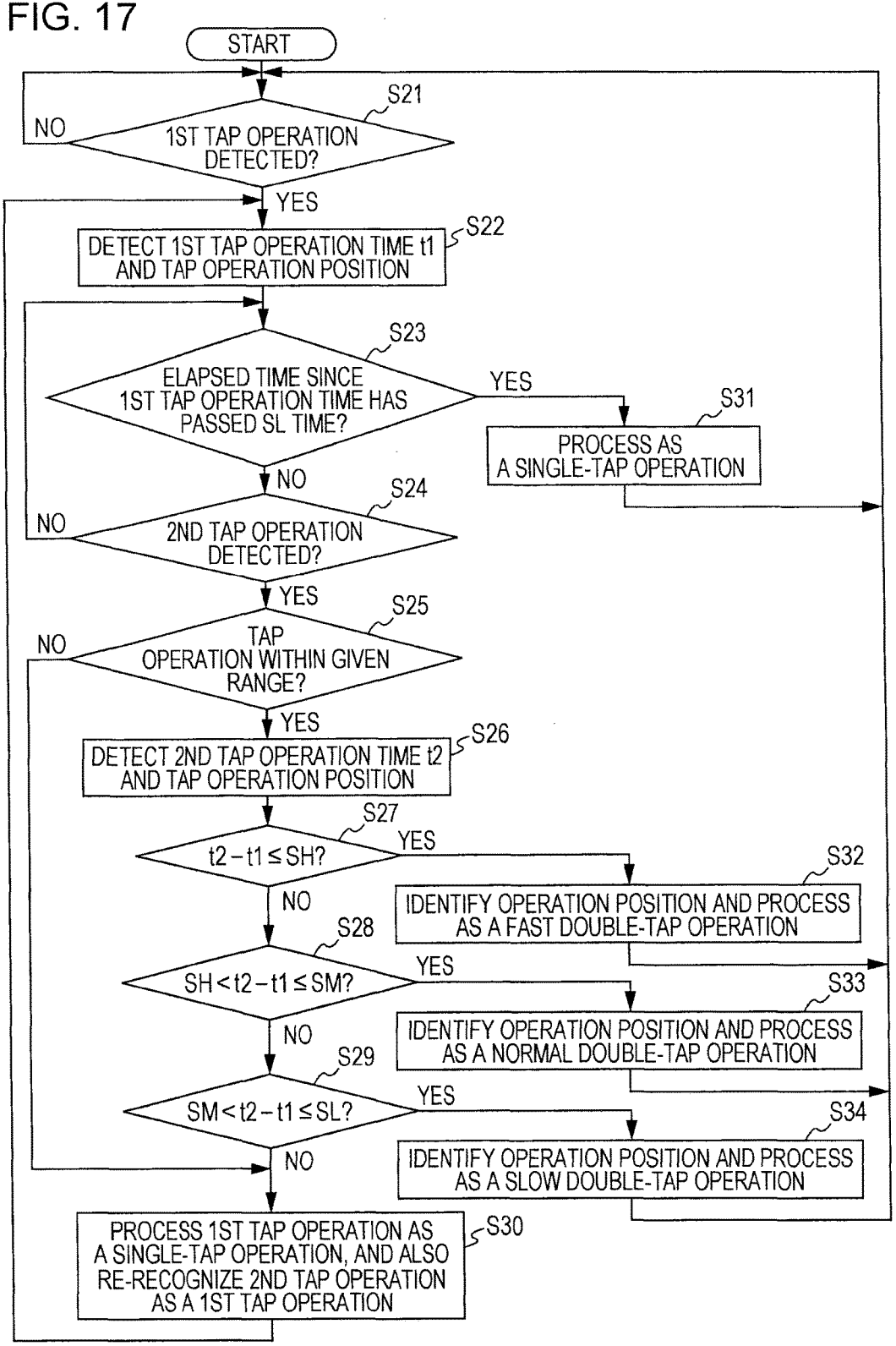
FIG. 17 is a flowchart for explaining input processing action of a mobile phone according to a second embodiment.

FIG. 17 illustrates a flowchart of input processing action of a mobile phone according to the second embodiment. When the basic programs of the BIOS (Basic Input/Output System) and OS (Operating System) are launched due to the main power supply of the mobile phone being engaged, the controller 15 loads an input processing program stored in the memory 14 and starts the process illustrated by the flowchart in FIG. 17 on the basis of the input processing program.

Although description will proceed hereinafter taking by way of example the case where a double-tap operation is conducted as the consecutive input operation, the case where a double-click operation is conducted as the consecutive input operation involves action similar to that described hereinafter. For this reason, reference to the following description is encouraged for action in the case where a double-click operation is conducted.

Also, description will proceed by taking the controller 15 to determine an input operation as a double-tap operation in the case where the first tap operation position and the second tap operation position are made within operation ranges of respectively predetermined sizes (conducted within an area of given size on the touch panel 5), and also made consecutively within the amount of time of a slow double-tap determining threshold value SL to be hereinafter described. It may also be configured such that in the case where the first tap operation position and the second tap operation position are outside the operation ranges of predetermined sizes, the controller 15 treats the tap operations as respective single-tap operations, or cancels the tap operations without accepting them.

First, in step S21 of the flowchart in FIG. 17, the controller 15 functions as the input operation detector 21 illustrated in FIG. 16 to periodically monitor changes in the capacitance values detected by the capacitive sensors of the touch panel 5, and determines whether or not a first tap operation has been conducted by the user.

In other words, if a tap operation is performed by the user, the capacitance values detected by the capacitive sensors at the place on the touch panel 5 corresponding to that tap operation will exhibit high values. For this reason, the controller 15 compares the capacitance values detected the capacitive sensors to a tap operation detection threshold value stored in the input operation detection memory 16, and in the case where a capacitance value equal to or greater than the tap operation detection threshold value is detected, determines that a first tap operation has been conducted by the user and advances the process to step S22.

In step S22, the controller 15 functions as the touch interval determiner 22 illustrated in FIG. 16 to acquire time information counted by the timer 10 and detect (identify) the first tap operation time t1.

Also, in step S22, the controller 15 functions as the operation position detector 24 illustrated in FIG. 16 to detect the position of the first tap operation on the touch panel 5.

Upon detecting the first tap operation time t1 and the tap operation position, the controller 15 advances the process to step S23.

In step S23, the controller 15 functions as the touch interval determiner 22 to determine, on the basis of the time information counted by the timer 10, whether or not the elapsed time since the first tap operation time t1 has passed the time of the slow double-tap determining threshold value SL.

The controller 15 then advances the process to step S31 in the case of determining that the elapsed time since the first tap operation time t1 has passed the time of the slow double-tap determining threshold value SL, and advances the process to step S24 in the case of determining that the elapsed time since the first tap operation time t1 has not passed the time of the slow double-tap determining threshold value SL.

The elapsed time since the first tap operation time t1 passing the time of the slow double-tap determining threshold value SL means that the tap operation is a single-tap operation. For this reason, in step S31 the controller 15 recognizes the first tap operation as a single-tap operation and functions as the application executor 23 illustrated in FIG. 16 to control the execution of information processing corresponding to the above single-tap operation on the basis of the currently active application program.

In contrast, upon advancing the process to step S24 by determining that the elapsed time since the first tap operation time t1 has not passed the time of the slow double-tap determining threshold value SL, the controller 15 functions as the input operation detector 21 illustrated in FIG. 16 to determine whether or not a second tap operation has been conducted by the user, on the basis of capacitance values detected by the capacitive sensors of the touch panel 5.

The controller 15 returns the process to step S23 in the case of not detecting a second tap operation, since the amount of time elapsed since the first tap operation was performed has not passed the time expressed by the slow double-tap determining threshold value. Then, in step S23 and step S24, the passing of the time expressed by the slow double-tap determining threshold value and the presence or absence of a second tap operation are monitored.

Next, upon advancing the process to step S25 by detecting a second tap operation within the time expressed by the slow double-tap determining threshold value in step S24, the controller 15 functions as the operation position detector 24 to detect the operation position of this second tap operation on the touch panel 5.

Then, the controller 15 compares the operation position of the first tap operation detected in step S22 to the operation position of the second tap operation detected in step S25 to determine whether or not the first tap operation and the second tap operation are tap operations within a given range that establishes a double-tap operation.

In other words, in the case of a mobile phone in this embodiment, it is configured such that the controller 15 recognizes that a double-tap operation has been performed in the case of detecting a second tap operation within a given range centered about the operation position of a first tap operation.

When a second tap operation is conducted outside of a given range centered about the operation position of a first tap operation, there is a high probability that the user is conducting at least the first tap operation as a single-tap operation.

For this reason, the controller 15 advances the process to step S30 upon determining in step S25 that a second tap operation was conducted outside a given range centered about the operation position of a first tap operation. Then, in step S30 the controller 15 processes the first tap operation as a single-tap operation while also re-recognizing the second tap operation as a first tap operation, returns the process to step S22, and identifies the operation time and operation position of the re-recognized tap operation.

In contrast, in the case of determining that a second tap operation was conducted within a given range centered about the operation position of a first tap operation, the controller 15 recognizes that a double-tap operation has been performed with the first tap operation and the second tap operation, and advances the process to step S26.

In step S26, the controller 15 functions as the touch interval determiner 22 to acquire time information counted by the timer 10 and detect (identify) the second tap operation time t2.

Also, in step S26, the controller 15 functions as the operation position detector 24 to detect the position of the second tap operation on the touch panel 5.

Upon detecting the second tap operation time t2 and tap operation position, the controller 15 advances the process to step S27.

In step S27, the controller 15 determines whether or not the temporal operation interval from the first tap operation time t1 to the second tap operation time t2 is less than or equal to the amount of time expressed by the fast double-tap determining threshold value SH stored in the input operation detection threshold value memory 16 (t2−t1≤SH). The controller 15 then advances the process to step S32 in the case of determining that the operation interval is less than or equal to the time expressed by the fast double-tap determining threshold value SH, and advances the process to step S28 in the case of determining that the operation interval exceeds the time expressed by the fast double-tap determining threshold value SH.

The above operation interval being less than or equal to the amount of time expressed by the fast double-tap determining threshold value SH means that the double-tap operation is a fast double-tap operation conducted by the user in a hurried state of mind. For this reason, in step S32 the controller 15 functions as the operation position detector 24 to identify the operation position of the double-tap operation on the basis of the operation position of the first tap operation and the operation position of the second tap operation.

Specifically, in step S32 the controller 15 compares the operation position of the first tap operation to the operation position of the second tap operation, and in the case where the difference between the operation positions is less than or equal to a given difference, determines that the tap operations were performed at the same position, and identifies that operation position. Also, in the case where the difference between the operation position of the first tap operation and the operation position of the second tap operation is greater than a given difference, the controller 15 determines that the tap operations were performed at respectively different positions within a range that establishes a double-tap operation, and identifies each operation position.

Also, in step S32 the controller 15 functions as the application executor 23 to control the execution of processing corresponding to a fast double-tap operation at the identified operation position from among the processing of the currently active application program, and returns the process to step S21.

In contrast, upon advancing the process to step S28 by determining that the above operation interval has exceeded the time expressed by the fast double-tap determining threshold value SH, the controller 15 determines whether or not the operation interval from the first tap operation time t1 to the second tap operation time t2 is less than or equal to the amount of time expressed by the normal double-tap determining threshold value SM stored in the input operation detection threshold value memory 16 (SH<t2−t1≤SM).

The controller 15 then advances the process to step S33 in the case of determining that the operation interval is less than or equal to the time expressed by the normal double-tap determining threshold value SM, and advances the process to step S29 in the case of determining that the operation interval has exceeded the time expressed by the normal double-tap determining threshold value SM.

The above operation interval being less than or equal to the amount of time expressed by the normal double-tap determining threshold value SM means that the double-tap operation is a double-tap operation at normal speed conducted by the user in an ordinary state of mind. For this reason, in step S33 the controller 15 functions as the operation position detector 24 to identify the operation position of the double-tap operation on the basis of the operation position of the first tap operation and the operation position of the second tap operation.

Also, in step S33 the controller 15 functions as the application executor 23 to control the execution of processing corresponding to a normal double-tap operation at the identified operation position in the currently active application program, and returns the process to step S21.

In contrast, upon advancing the process to step S29 by determining that the above operation interval has exceeded the time expressed by the normal double-tap determining threshold value SM, the controller 15 determines whether or not the operation interval from the first tap operation time t1 to the second tap operation time t2 is less than or equal to the amount of time expressed by the slow double-tap determining threshold value SL stored in the input operation detection threshold value memory 16 (SM<t2−t1≤SL).

The controller 15 then advances the process to step S34 in the case of determining that the operation interval is less than or equal to the time expressed by the slow double-tap determining threshold value SL, and advances the process to step S30 in the case of determining that the operation interval has exceeded the time expressed by the slow double-tap determining threshold value SL.

The operation interval being less than or equal to the time expressed by the slow double-tap determining threshold value SL means that the double-tap operation is a slow double-tap operation conducted with the user in an unhurried state of mind. For this reason, in step S34 the controller 15 functions as the operation position detector 24 to identify the operation position of the double-tap operation on the basis of the operation position of the first tap operation and the operation position of the second tap operation.

Also, in step S34 the controller 15 functions as the application executor 23 to control the execution of processing corresponding to a slow double-tap operation at the identified operation position in the currently active application program, and returns the process to step S21.

Also, upon advancing the process to step S30 by determining that the above operation interval has exceeded the time expressed by the slow double-tap determining threshold value SL, the controller 15 first functions as the application executor 23 to recognize the first tap operation which was detected before detecting the second tap operation as a single-tap operation and control the execution of processing corresponding to the single-tap operation in the currently active application program.

Also, in step S30, the controller 15 re-recognizes the second tap operation as a first tap operation, and returns the process to step S22. Thus, in the above step S24 and step S25, the presence or absence of a second tap operation is monitored until the elapsed time since the time t1 of the re-recognized first tap operation exceeds the time expressed by the above slow double-tap determining threshold value SL.

Also, in the above step S31, the re-recognized first tap operation is likewise processed as a single-tap operation in the case where the elapsed time since the time t1 of the above re-recognized first tap operation has exceeded the time expressed by the above slow double-tap determining threshold value SL.

[Information Processing According to Double-tap Operation Type and Operation Position]

Next, exemplary information processing corresponding the double-tap operation type and operation position in a mobile phone of the second embodiment will be described.

Figure 18A:
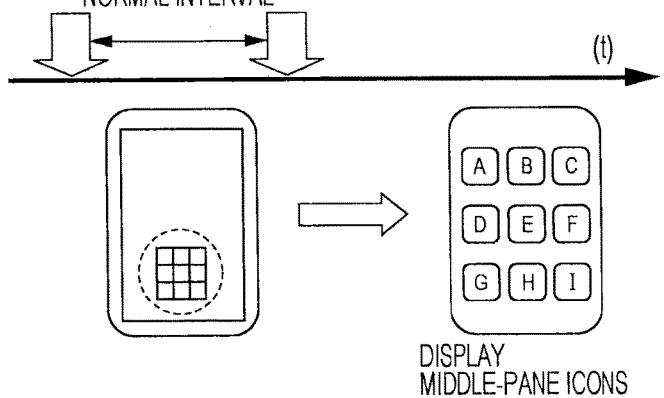
FIGS. 18A, 18B, 18C, and 18D are diagrams for explaining action during a fast double-tap operation in a mobile phone according to a second embodiment.

In the case of a mobile phone of the second embodiment, it is configured such that the controller 15 displays a software key for specifying the display of an icon display screen, i.e., an icon that activates an application program list screen, on a standby screen as illustrated in FIG. 18(a).

Although but an example, this icon that activates an application program list screen is shaped like a square overall, with a design in which the area inside the square is uniformly subdivided into nine square areas.

Figure 19:
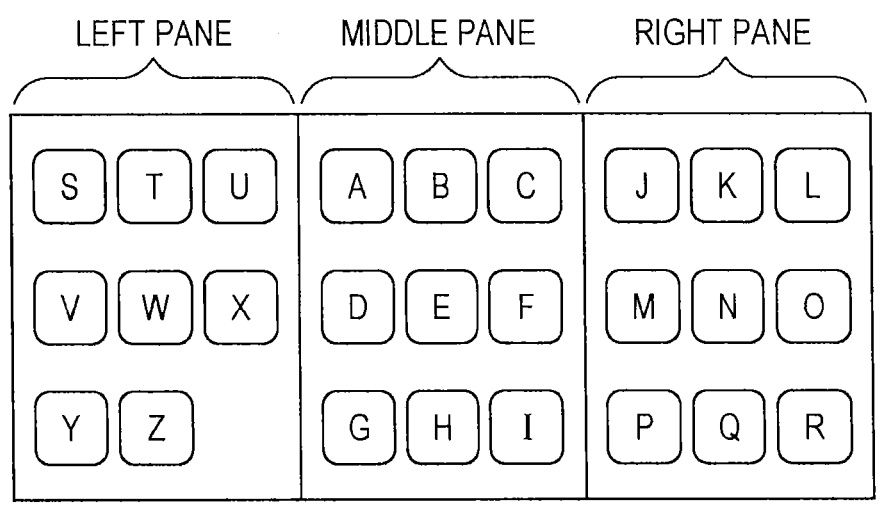
FIG. 19 is a diagram for explaining an icon display screen in which icons are separated and held in three display units (a left pane, a middle pane, and a right pane).

Also, in the case of a mobile phone of the second embodiment, it is configured such that the controller 15 divides the entire icon display screen into three display units consisting of a left pane, a middle pane, and a right pane as illustrated in FIG. 19, and displays one pane of the icon display screen on the touch panel 5.

Meanwhile, the example illustrated in FIG. 19 is an example in which a total of nine icons A to I are disposed on the middle pane, a total of nine icons J to R are disposed on the right pane, and a total of eight icons S to Z are disposed on the left pane. In the case where the controller 15 displays the middle pane on the touch panel 5, the nine icons A to I are displayed on the touch panel 5. Similarly, in the case where the controller 15 displays the left pane on the touch panel 5, the nine icons S to Z are displayed on the touch panel 5.

Also, among the columns of three consecutive square areas each in the icon that activates an application program list screen, it is configured such that, described in order, the left column is a column operated when specifying the display of the left pane, the middle column is a column operated when specifying the display of the middle pane, and the right column is a column operated when specifying the display of the right pane.

First, in the case of a mobile phone of the second embodiment, upon detecting that a normal double-tap operation (or a single-tap operation) has been performed on the display position of the icon that activates an application program list screen, the controller 15 displays the middle pane on the touch panel 5, as illustrated in FIG. 18(a). Thus, the nine icons A to I are displayed.

In other words, a normal double-tap operation being performed means that the user is operating the mobile phone in an ordinary state of mind. Also, icons of application programs ordinarily used by the user are often disposed on the middle pane.

For this reason, the controller 15 displays the middle pane on the touch panel 5 in the case of detecting that a normal double-tap operation on the display position of the icon that activates an application program list screen.

Figure 18B:
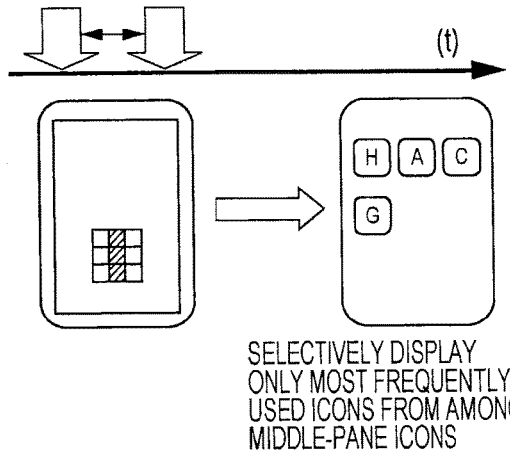
Figure 18C:
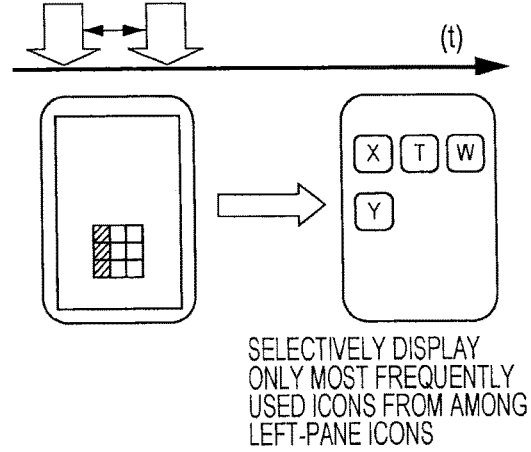
Figure 18D:
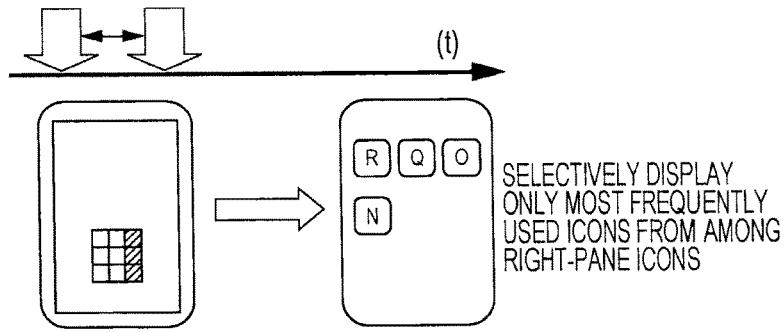

Next, in the case where a fast double-tap operation is performed on the middle column of the icon that activates an application program list screen as indicated by the shaded portion in FIG. 18(b), the controller 15 takes the icons for some of the most frequently used application programs from among the icons of application programs on the middle pane, sorts them in order of highest usage frequency, and displays them on the touch panel 5.

Specifically, in the case of this mobile phone, an application activation count table, which stores the number of times each application program has been activated, is included in the memory 14. Each time the controller 15 activates an application program, the controller 15 increments the activation count for the activated application program by 1 in the application activation count table. Thus, activation counts for individual application programs are respectively stored in the application activation count table.

When a fast double-tap operation is performed on the middle column of the icon that activates an application program list screen, the controller 15 references the application activation count table stored in the memory 14 and detects the activation counts for the application programs on the middle pane.

For example, in the case where the application programs A to I are, in order of highest usage frequency, the application program H, the application program A, the application program C, the application program G, the application program B, the application program E, etc., the controller 15 displays four application program icons for the application program H, the application program A, the application program C, and the application program G on the touch panel 5 in the above order of usage frequency.

When a fast double-tap operation is performed on the middle column of the icon that activates an application program list screen, there is a high probability that the user desires immediate activation of one of the application programs whose icons are disposed on the middle pane.

For this reason, the controller 15 displays on the touch panel 5 icons for some of the most frequently used application programs from among the application programs whose icons are disposed on the middle pane, as illustrated in FIG. 18(*b*).

Thus, since the icons displayed are icons for some of the most frequently used application programs, it is possible to enable the user to more easily recognize the icon for a desired application program. Consequently, the user is able to rapidly recognize and activate the icon for a desired application program.

Similarly, in the case where a fast double-tap operation is performed on the left column of the icon that activates an application program list screen as indicated by the shaded portion in FIG. 18(*c*), the controller 15 takes the icons of some of the most frequently used application programs from among the icons of application programs on the left pane, sorts them in order of highest usage frequency, and displays them on the touch panel 5.

For example, in the case where the application programs S to Z disposed on the left pane are, in order of highest usage frequency, the application program X, the application program T, the application program W, the application program Y, the application program S, the application program V, etc., the controller 15 displays four application program icons for the application program X, the application program T, the application program W, and the application program Y on the touch panel 5 in the above order of usage frequency.

Thus, as discussed earlier, since the icons displayed are icons for some of the most frequently used application programs, it is possible to make it easier for the user to recognize the icon for a desired application program. Consequently, the user is able to rapidly recognize and activate the icon for a desired application program.

Similarly, in the case where a fast double-tap operation is performed on the right column of the icon that activates an application program list screen as indicated by the shaded portion in FIG. 18(*d*), the controller 15 takes the icons of some of the most frequently used application programs from among the icons of application programs on the right pane, sorts them in order of highest usage frequency, and displays them on the touch panel 5.

For example, in the case where the application programs J to R disposed on the right pane are, in order of highest usage frequency, the application program R, the application program Q, the application program O, the application program N, the application program J, the application program K, etc., the controller 15 displays four application program icons for the application program R, the application program Q, the application program O, and the application program N on the touch panel 5 in the above order of usage frequency.

Thus, as discussed earlier, since the icons displayed are icons for some of the most frequently used application programs, it is possible to make it easier for the user to recognize the icon for a desired application program. Consequently, the user is able to rapidly recognize and activate the icon for a desired application program.

Figure 20A:
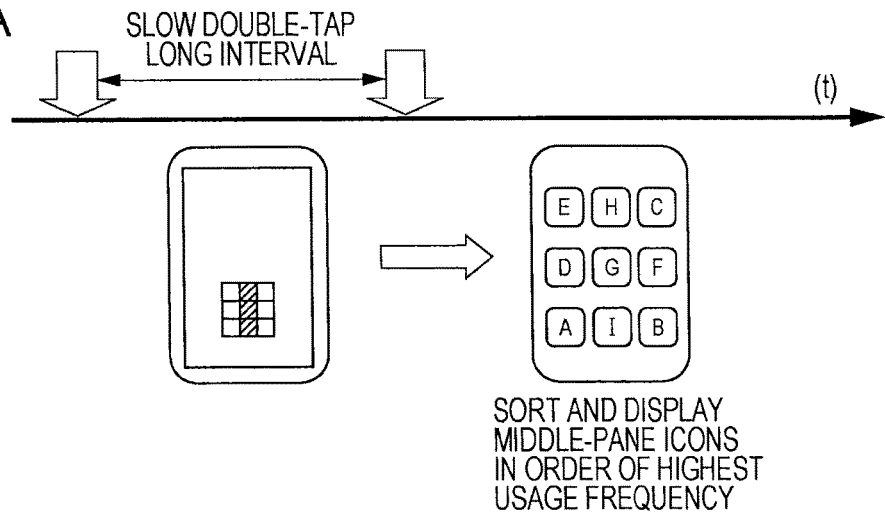
FIGS. 20A, 20B, and 20C are diagrams for explaining action during a slow double-tap operation in a mobile phone according to a second embodiment.
Figure 20B:
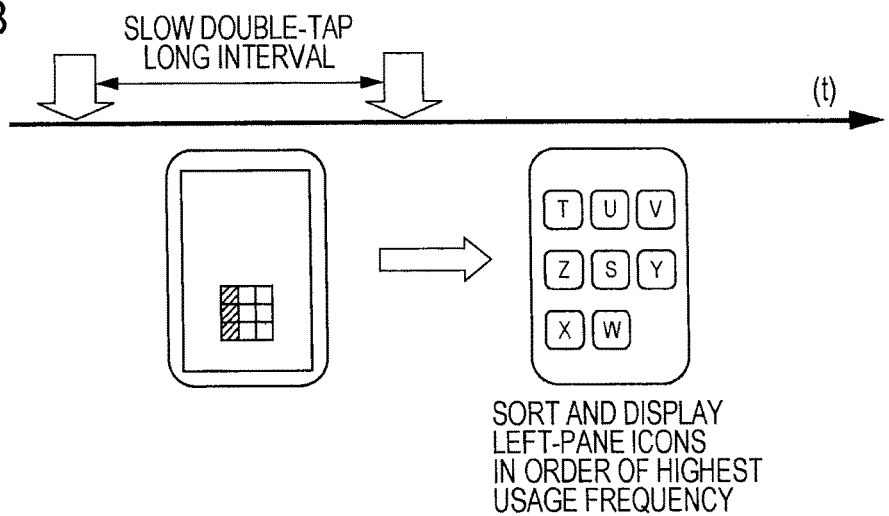
Figure 20C:
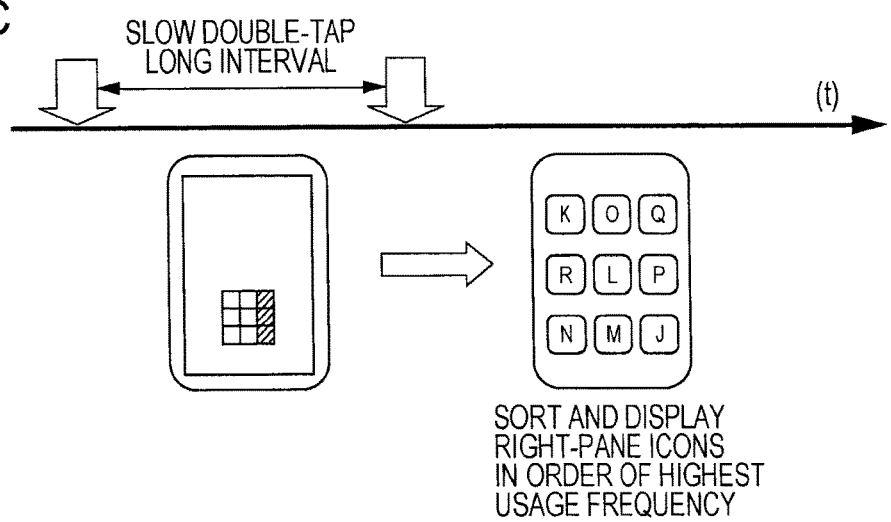

Next, in the case where a slow double-tap operation is performed on the middle column of the icon that activates an application program list screen as indicated by the shaded portion in FIG. 20(*a*), the controller 15 references the application activation count table stored in the memory 14, sorts the icons of application programs on the middle pane in order of highest usage frequency, and displays them on the touch panel 5.

A slow double-tap operation being performed on the middle column of the icon that activates an application program list screen means that the user has, to some degree, plenty of time.

For this reason, the controller 15 is able to make it easier for the user to recognize the icon for a desired application program by sorting the icons of application programs on the middle pane in order of highest usage frequency and displaying them on the touch panel 5, as illustrated in FIG. 20(*a*). Consequently, the user is able to rapidly recognize and activate the icon for a desired application program.

Similarly, in the case where a slow double-tap operation is performed on the left column of the icon that activates an application program list screen as indicated by the shaded portion in FIG. 20(*b*), the controller 15 references the application activation count table stored in the memory 14, sorts the application program icons for the applications S to Z on the left pane in order of highest usage frequency, and displays them on the touch panel 5.

Thus, it is possible to make it easier for the user to recognize the icon for a desired application program. Consequently, the user is able to rapidly recognize and activate the icon for a desired application program.

Similarly, in the case where a slow double-tap operation is performed on the right column of the icon that activates an application program list screen as indicated by the shaded portion in FIG. 20(*c*), the controller 15 references the application activation count table stored in the memory 14, sorts the application program icon for the applications J to R on the right pane in order of highest usage frequency, and displays them on the touch panel 5.

Thus, it is possible to make it easier for the user to recognize the icon for a desired application program. Consequently, the user is able to rapidly recognize and activate the icon for a desired application program.

Figure 21A:
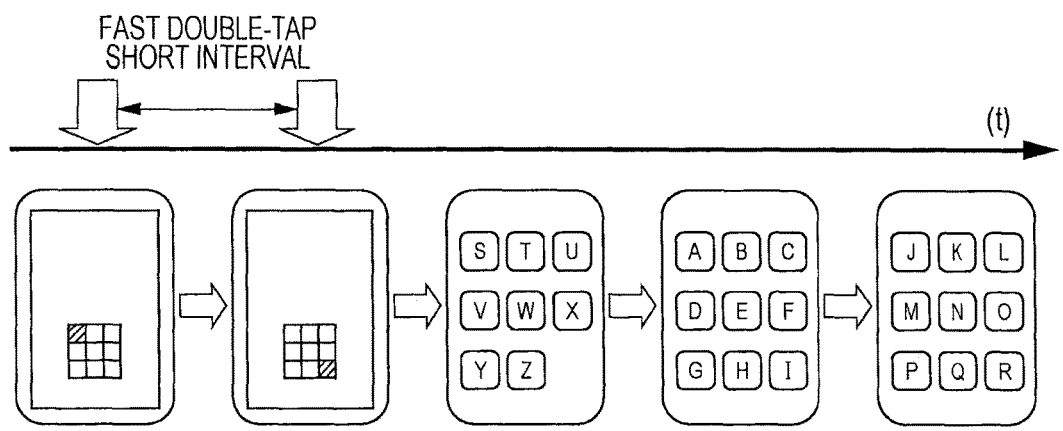
FIGS. 21A and 21B are diagrams for explaining other action during a fast double-tap operation in a mobile phone according to a second embodiment.
Figure 21B:
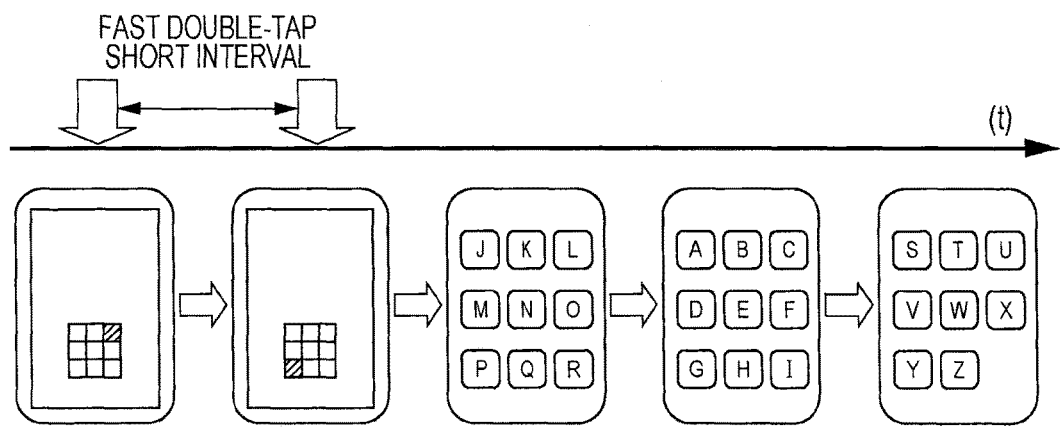

Next, in the case where tap operations are performed in order on the top row of the left column and the bottom row of the right column of the icon that activates an application program list screen, and a fast double-tap operation is established by the tap operations as indicated by the shaded portion in FIG. 21(*a*), the controller 15 displays icons by automatically switching among the panes at a given time interval in the order of left pane, middle pane, right pane.

Similarly, in the case where tap operations are performed in order on the top row of the right column and the bottom row of the left column of the icon that activates an application program list screen, and a fast double-tap operation is established by the tap operations as indicated by the shaded portion in FIG. 21(*b*), the controller 15 displays icons by automatically switching among the panes at a given time interval in the order of right pane, middle pane, left pane.

However, in the case of displaying by switching among panes in this way, application program icons on each pane may also be sorted in order of highest usage frequency and displayed. Also, the icons for some of the most frequently used application programs may be selected from among the application program icons on each pane, and these may be sorted in order of highest usage frequency and displayed.

[Advantages of Second Embodiment]

As is apparent from the above description, a mobile phone according to a second embodiment executes respectively different information processing depending on the temporal interval of a double-tap operation as well as the position of the double-tap operation.

Thus, since a single double-tap operation can be separately utilized as many types of double-tap operations depending on the temporal interval and operation position, further improvement in the usability of the mobile phone can be attempted, in addition to obtaining advantages similar to those of the first embodiment discussed earlier.

[Third Embodiment]

Next, a mobile phone according to a third embodiment will be described.

A mobile phone of the first and second embodiments discussed above conducted information processing by detecting a "touch operation" in which an operating element such as the user's finger touches the touch panel 5.

Figure 22A:
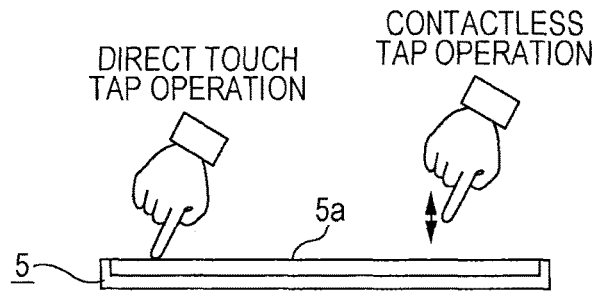
FIGS. 22A, 22B, and 22C are diagrams for explaining respective threshold values in a mobile phone according to a third embodiment.

In contrast, a mobile phone of the third embodiment is configured to conduct information processing by detecting both "touch operations" in which an operating element such as the user's finger touches the touch panel 5, as well as "contactless operations" conducted in a state where an operating element such as the user's finger is brought close to the touch panel 5 but does not touch the touch panel 5, as illustrated in FIG. 22(*a*).

(Principal Configuration of Third Embodiment)

FIG. 23 illustrates exemplary capacitance values detected during a touch operation for all capacitive sensors on the touch panel 5. During a touch operation, the capacitance value of the capacitive sensor where the touch operation is centered and the capacitance values of the immediately adjacent sensors are detected as large capacitance values, as indicated by being enclosed in bold lines in FIG. 23.

The waveform of capacitance values at a touch operation location on the touch panel 5 is a waveform that rises sharply in a narrow area, as illustrated in FIG. 22(*b*).

In contrast, FIG. 24 illustrates exemplary capacitance values detected during a contactless operation for all capacitive sensors on the touch panel 5. During a contactless operation, capacitance values which have changed to intermediate values over a wider area than that during a touch operation are detected, as indicated by being enclosed in bold lines in FIG. 24.

The waveform of capacitance values at a contactless operation location on the touch panel 5 is a waveform expressing intermediate capacitance values over a wide area, as illustrated in FIG. 22(*c*).

In the case of a mobile phone of the third embodiment, a threshold value for detecting a touch operation, indicated by the two-point chain line in FIGS. 22(*b*) and 22(*c*), is included in the input operation detection threshold value memory 16. The controller 15 determines that a touch operation has been performed by the user in the case of detecting at least a given number of capacitance values equal to or greater than the threshold value for detecting a touch operation from among the capacitance values of the capacitive sensors in the touch panel 5.

Also, in the case of a mobile phone of the third embodiment, a first threshold value for detecting a contactless tap operation, indicated by the thin line in FIGS. 22(*b*) and 22(*c*), as well a second threshold value for detecting a contactless tap operation, indicated by the thick line, are included in the input operation detection threshold value memory 16.

As illustrated in FIGS. 22(*b*) and 22(*c*), the second threshold value for detecting a contactless tap operation is lower than the threshold value for detecting a touch operation indicated by the two-point chain line, and in addition, is set to a value enabling comparison of capacitance values during a contactless operation which appear at lower values than those of a touch operation, as illustrated in FIG. 22(*c*).

Also, the first threshold value for detecting a contactless tap operation is lower than the second threshold value for detecting a contactless tap operation, and in addition, is set to a value enabling comparison of capacitance values during a contactless operation which appear at lower values than those of a touch operation, as illustrated in FIG. 22(*c*).

Although discussed later, in the case of a mobile phone of the third embodiment, it is configured such that the controller 15 determines that a contactless fast double-tap operation has been performed by the user in the case of detecting at least a given number of capacitance values which are equal to or greater than the first threshold value for detecting a tap operation but less than the second threshold value for detecting a tap operation from among the capacitance values of the capacitive sensors in the touch panel 5.

In other words, in the case of a mobile phone of the third embodiment, it is configured such that the controller 15 determines that a fast double-tap operation has been conducted simply because of conducting an operation in which an operating element comes near and then moves away from the touch panel 5 once, such that capacitance values equal to or greater than the first threshold value for detecting a tap operation but less than the second threshold value for detecting a tap operation are detected.

Similarly, it is configured such that the controller 15 determines that a contactless slow double-tap operation has been performed by the user in the case of detecting at least a given number of capacitance values equal to or greater than the second threshold value for detecting a tap operation but less than the threshold value for detecting a touch operation from among the capacitance values of the capacitive sensors in the touch panel 5.

In other words, in the case of a mobile phone of the third embodiment, it is configured such that the controller 15 determines that a slow double-tap operation has been conducted simply because of conducting an operation in which an operating element comes near and then moves away from the touch panel 5 once, such that capacitance values equal to or greater than the second threshold value for detecting a tap operation but less than the threshold value for detecting a touch operation are detected.

Figure 25:
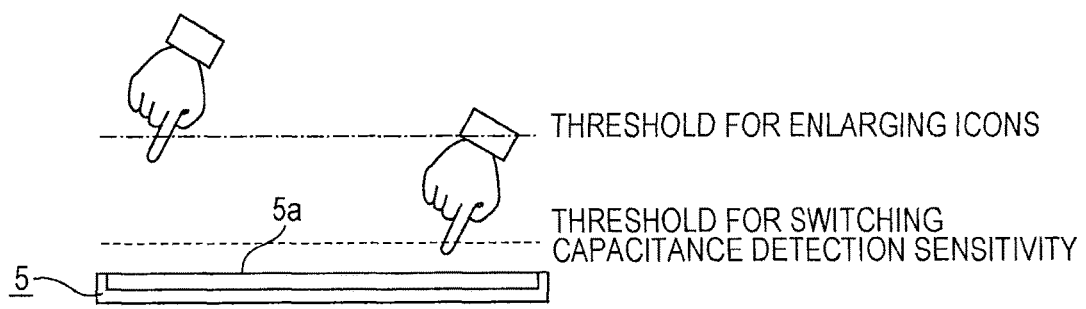
FIG. 25 is a diagram for explaining a threshold value for enlarging icons and a threshold value for switching the capacitance detection sensitivity in a mobile phone according to a third embodiment.

Next, a mobile phone of the third embodiment is configured to enlarge icons being displayed on the touch panel 5 and also attempt to improve the capacitance value detection sensitivity by raising the gain amplifying capacitance values detected by the capacitive sensors in the touch panel 5, for example, in the case where an operating element such as the user's finger is brought within at least a given distance to the operable surface 5*a* of the touch panel 5, as illustrated in FIG. 25.

Also, it is configured such that in the case where an operating element such as the user's finger is brought within at least a given distance to the operable surface 5*a* of the touch panel 5 as illustrated in FIG. 25, the controller 15 lowers the raised gain amplifying the capacitance values, reverting it back to the original gain for touch operations.

In order to conduct such icon enlargement control and variable control of the capacitance detection sensitivity, a threshold value for enlarging icons, indicated by the one-point chain line in FIG. 25, and a threshold value for switching the capacitance detection sensitivity, indicated by the broken line in FIG. 25, are stored in the input operation detection threshold value memory 16 of a mobile phone of this embodiment.

Figure 22B:
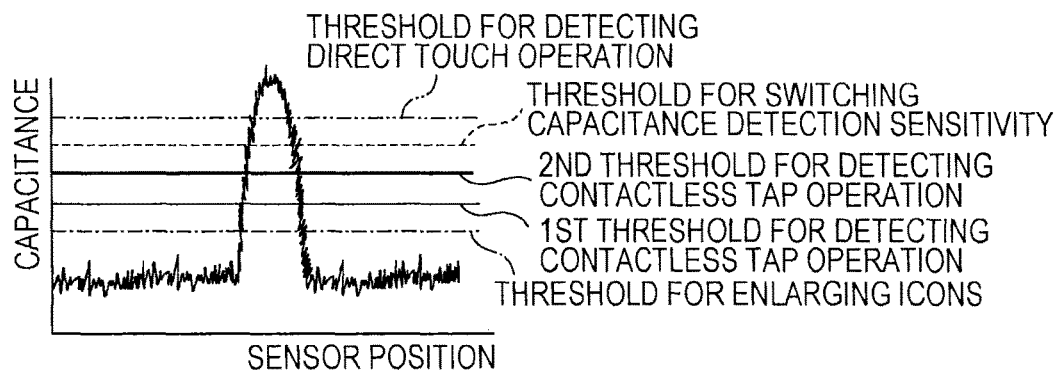
Figure 22C:
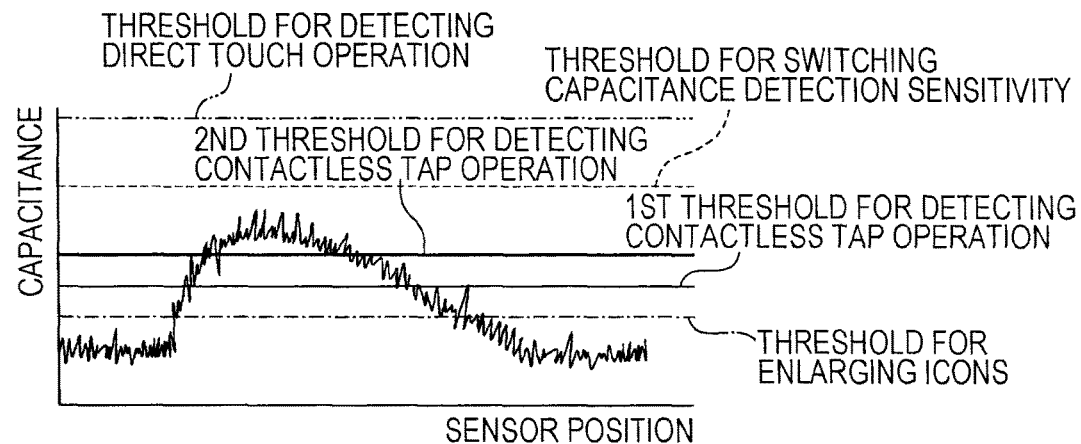

The threshold value for enlarging icons is set to a lower value than the first threshold value for detecting a contactless tap operation, as indicated by respective one-point chain lines in FIGS. 22(b) and 22(c).

Also, the threshold value for switching the capacitance detection sensitivity is set to a value between the threshold value for detecting a touch operation and the second threshold value for detecting a contactless tap operation, as indicated by respective broken lines in FIGS. 22(b) and 22(c).

(Input Processing Action In Third Embodiment)

Figure 26A:
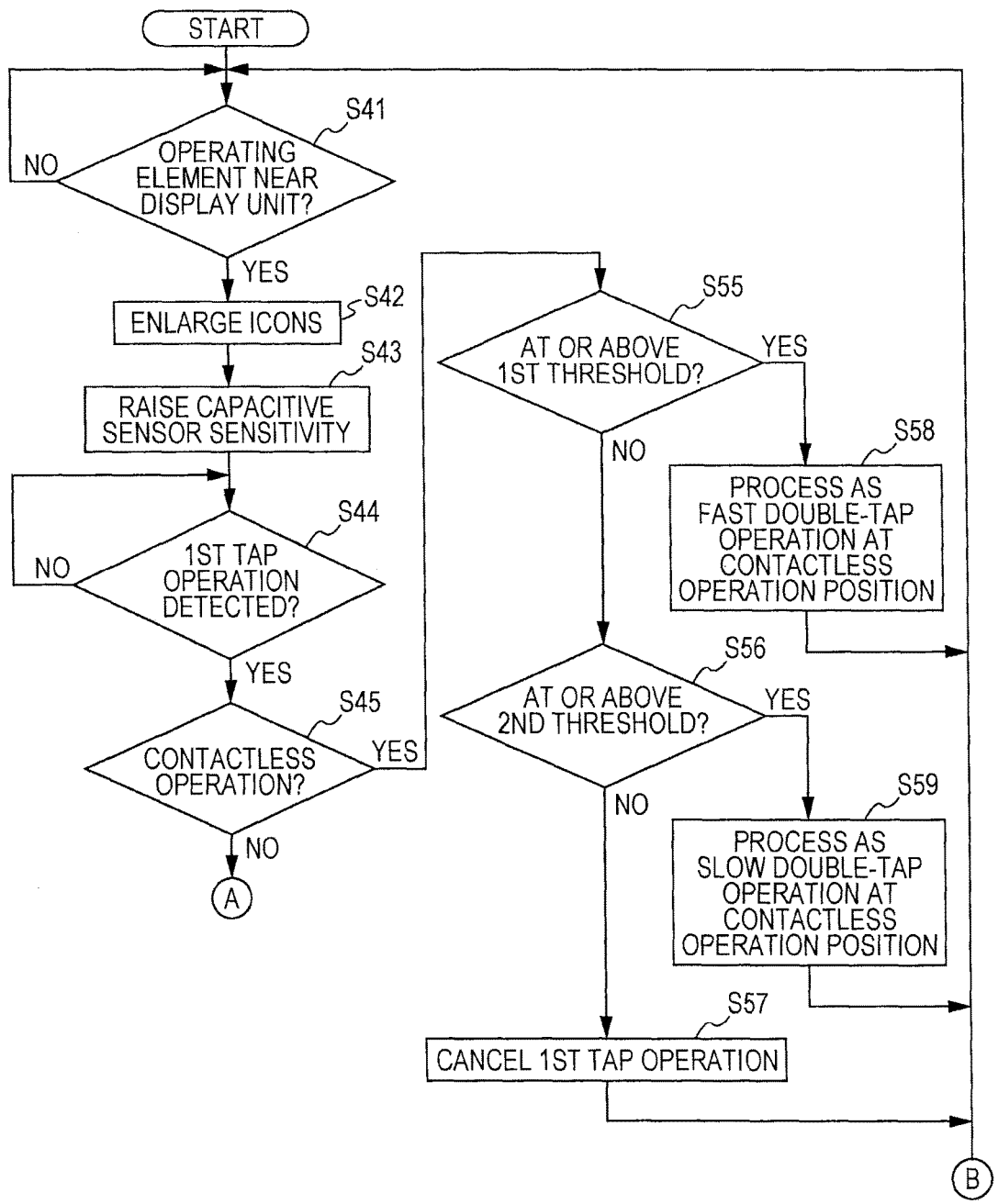
FIGS. 26A and 26B show a flowchart for explaining input processing action of a mobile phone according to a third embodiment.
Figure 26B:
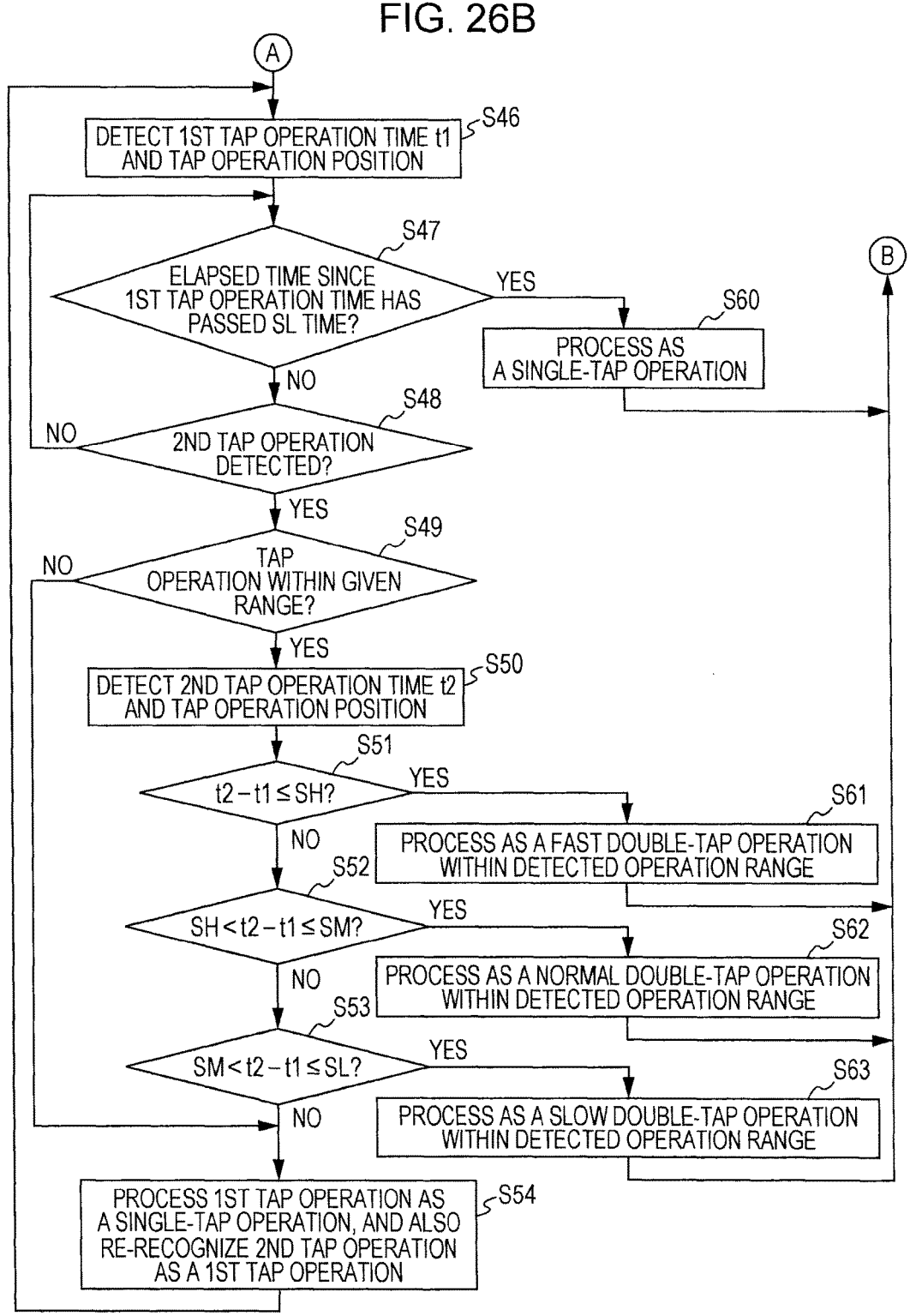

FIG. 26 illustrates a flowchart of input processing action of a mobile phone according to the third embodiment. When the basic programs of the BIOS (Basic Input/Output System) and OS (Operating System) are launched due to the main power supply of the mobile phone being engaged, the controller 15 loads an input processing program stored in the memory 14 and starts the process illustrated by the flowchart in FIG. 26 on the basis of the input processing program.

Figure 27A:
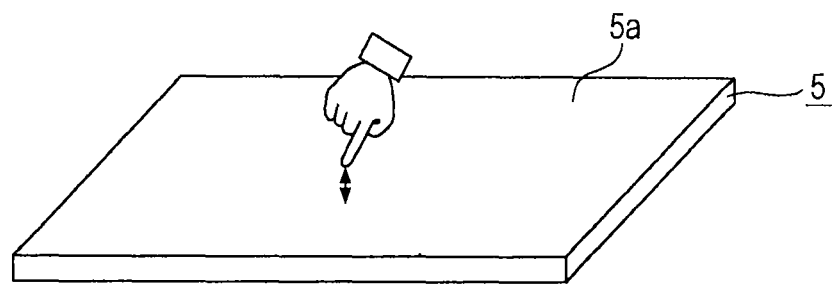
FIGS. 27A, 27B, and 27C are diagrams for explaining an enlarged icon display process in a mobile phone according to a third embodiment.

In step S41, the controller 15 periodically monitors changes in the capacitance values detected by the capacitive sensors of the touch panel 5 to determine whether or not an operating element such as the user's finger has come within at least a given distance to the display surface 5a of the touch panel 5, as illustrated in FIG. 25 or FIG. 27(a).

Specifically, the controller 15 determines that an operating element such as the user's finger has come within at least a given distance to the display surface 5a of the touch panel 5 and advances the process to step S42 in the case of detecting at least a given number of capacitance values equal to or greater than the threshold value for enlarging icons indicated in FIGS. 25, 22(b), and 22(c) from among the capacitance values detected by the capacitive sensors of the touch panel 5.

In step S42, since an operating element such as the user's finger has come within at least a given distance to the display surface 5a of the touch panel 5, the controller 15 detects the icon being displayed at the location approached by the operating element from among the icons currently being displayed on the touch panel 5. Then, the icon being displayed at the location approached by the operating element is enlarged by a given factor and displayed on the touch panel 5.

Figure 27B:
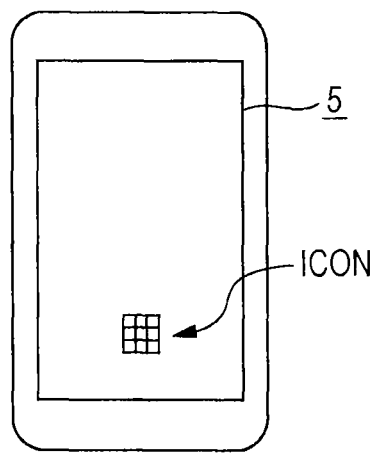
Figure 27C:
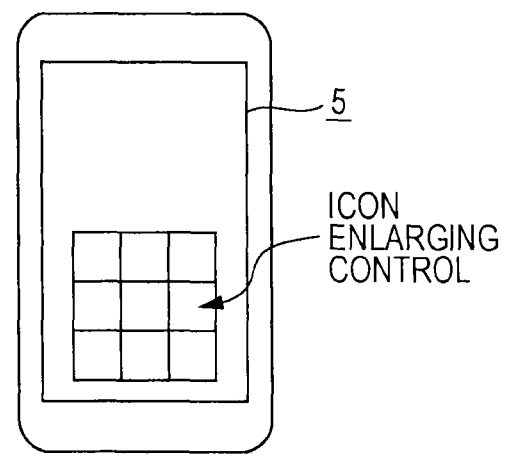

FIGS. 27(b) and 27(c) illustrate an example of enlarging the icon that activates an application program list screen. Upon detecting that an operating element such as the user's finger has come within at least a given distance to the icon that activates an application program list screen being displayed on the touch panel 5, the controller 15 enlarges the icon that activates an application program list screen by a given factor and displays it on the touch panel 5, as illustrated in FIGS. 27(b) and 27(c). Thus, it is possible to make it easier for the user to tap a desired location, such as the right column or middle column of the icon that activates an application program list screen.

Once an icon approached by the user's operating element is enlarged in this way, the controller 15 advances the process to step S43 and attempts to raise the capacitive sensor sensitivity.

Specifically, although but an example, the controller 15 raises by a given amount the gain of an amplifier that amplifies and outputs capacitance values detected by the capacitive sensors.

As a comparison of FIGS. 22(b) and 22(c) demonstrates, the values of the capacitance detected by capacitive sensors during a contactless operation are detected at lower values overall than during a touch operation. For this reason, an improvement in the detection precision of contactless operations can be attempted by attempting to raise the capacitive sensor sensitivity.

Figure 28:
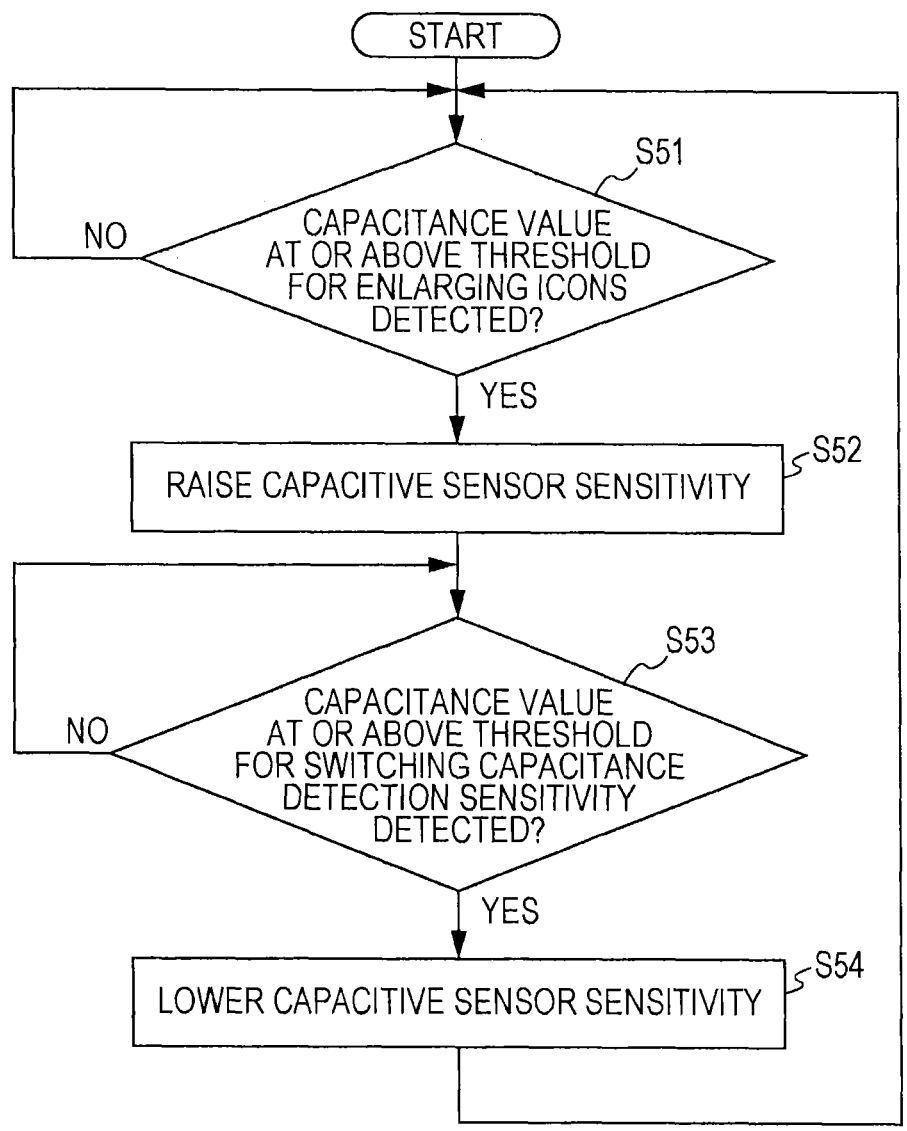
FIG. 28 is a flowchart for explaining a process for icon enlargement and a process for switching capacitance detection sensitivity in a mobile phone according to a third embodiment.

Herein, a flowchart of such a process for enlarging icons and a process for varying capacitive sensor sensitivity is illustrated in FIG. 28.

During execution of the flowchart in FIG. 26, the controller 15 determines whether or not capacitance values equal to or greater than the threshold value for enlarging icons have been detected in step S51 of the flowchart in FIG. 28, and also determines whether or not capacitance values equal to or greater than the threshold value for switching the capacitance detection sensitivity in step S53.

Then, in the case of detecting capacitance values equal to or greater than the threshold value for enlarging icons, the controller 15 attempts to raise the capacitive sensor sensitivity in step S52, and in the case of detecting capacitance values equal to or greater than the threshold value for switching the capacitance detection sensitivity, the controller 15 lowers the capacitive sensor sensitivity in step S54.

In other words, when the user's operating element has come within at least a given distance to the touch panel 5, the controller 15 conducts an icon enlargement process and also attempts to raise the capacitive sensor sensitivity in anticipation of a contactless operation, whereas when the user's operating element has come very close to the touch panel 5, the controller 15 lowers the capacitive sensor sensitivity in anticipation of a touch operation.

During execution of the flowchart in FIG. 26, the controller 15 repeatedly controls the execution of such a process for enlarging an icon and a process for varying capacitive sensor sensitivity according to the distance between the user's operating element and the touch panel 5.

Next, the controller 15 advances the process to step S44, and on the basis of the capacitance values of the capacitive sensors in the touch panel 5, determines whether or not a first tap operation has been conducted, and in step S45 also determines whether or not this first tap operation is a contactless operation.

Specifically, the controller 15 determines that a touch operation has been performed by the user and advances the process to step S46 in the case of detecting at least a given number of capacitance values equal to or greater than the threshold value for detecting a touch operation indicated in FIGS. 22(b) and 22(c) from the capacitance values of the capacitive sensors of the touch panel 5 in step S44 and step S45.

Also, the controller 15 determines that a contactless operation has been performed by the user and advances the process to step S55 in the case of detecting at least a given number of capacitance values less than the threshold value for detecting a touch operation indicated in FIGS. 22(b) and 22(c) from the capacitance values of the capacitive sensors of the touch panel 5.

Upon advancing the process to step S46 by determining that a touch operation has been performed by the user, the controller 15 acquires time information counted by the timer 10 and detects (identifies) the first tap operation time t1. Also, in step S46, the controller 15 detects the position of the first tap operation on the touch panel 5. Upon detecting the first tap operation time t1 and the tap operation position, the controller 15 advances the process to step S47.

In step S47, the controller 15 determines, on the basis of the time information counted by the timer 10, whether or not the elapsed time since the first tap operation time t1 has passed the time of the slow double-tap determining threshold value SL.

Then, the controller 15 advances the process to step S60 in the case of determining that the elapsed time since the first tap operation time t1 has passed the time of the slow double-tap determining threshold value SL, and advances the process to step S48 in the case of determining that the elapsed time since the first tap operation time t1 has not passed the time of the slow double-tap determining threshold value SL.

The elapsed time since the first tap operation time t1 passing the time of the slow double-tap determining threshold value SL means that the tap operation is a single-tap operation. For this reason, in step S60 the controller 15 recognizes the first tap operation as a single-tap operation, controls the execution of information processing corresponding to the single-tap operation on the basis of the currently active application program, and returns the process to step S41.

In contrast, upon advancing the process to step S48 by determining that the elapsed time since the first tap operation time t1 has not passed the time of the slow double-tap determining threshold value SL, the controller 15 determines whether or not a second touch tap operation has been conducted by the user, on the basis of capacitance values detected by the capacitive sensors of the touch panel 5.

The controller 15 returns the process to step S47 in the case of not detecting a second touch tap operation, since the amount of time elapsed since the first tap operation was performed has not passed the time expressed by the slow double-tap determining threshold value. Then, in step S47 and step S48, the passing of the time expressed by the slow double-tap determining threshold value and the presence or absence of a second touch tap operation are monitored.

Next, upon advancing the process to step S49 by detecting a second touch tap operation within the time expressed by the slow double-tap determining threshold value in step S48, the controller 15 detects the operation position of the second tap operation on the touch panel 5.

Then, the controller 15 compares the operation position of the first tap operation detected in step S46 to the operation position of the second tap operation detected in step S49 to determine whether or not the first tap operation and the second tap operation are tap operation within a given range that establishes a double-tap operation. However, it may also be configured such that in the case where the first tap operation position and the second tap operation position are outside the operation ranges of predetermined sizes, the controller 15 treats the tap operations as respective single-tap operations, or cancels the tap operations without accepting them.

In other words, in the case of a mobile phone in this embodiment, it is configured such that the controller 15 recognizes that a double-tap operation has been performed in the case of detecting a second touch tap operation within a given range centered about the operation position of a first touch tap operation.

When a second touch tap operation is conducted outside of a given range centered about the operation position of a first touch tap operation, there is a high probability that the user is conducting at least the first tap operation as a single-tap operation.

For this reason, in step S49 the controller 15 advances the process to step S54 upon determining that the second touch tap operation was conducted outside of a given range centered about the operation position of the first touch tap operation.

Then, in step S54 the controller 15 processes the first touch tap operation as a single-tap operation while also re-recognizing the second touch tap operation as a first touch tap operation, returns the process to step S46, and identifies the operation time and operation position of the re-recognized tap operation.

In contrast, in the case of determining that a second touch tap operation was conducted within a given range centered about the operation position of a first touch tap operation, the controller 15 recognizes that a touch double-tap operation has been performed with the first tap operation and the second tap operation, and advances the process to step S50.

In step S50, the controller 15 acquires time information counted by the timer 10 and detects (identifies) the second touch tap operation time t2. Also, in step S50, the controller 15 detects the position of the second tap operation on the touch panel 5. Upon detecting the second tap touch operation time t2 and tap operation position, the controller 15 advances the process to step S51.

In step S51, the controller 15 determines whether or not the operation interval from the first touch tap operation time t1 to the second touch tap operation time t2 is less than or equal to the amount of time expressed by the fast double-tap determining threshold value SH stored in the input operation detection threshold value memory 16 (t2−t1≤SH). Then, the controller 15 advances the process to step S61 in the case of determining that the operation interval is less than or equal to the time expressed by the fast double-tap determining threshold value SH, and advances the process to step S52 in the case of determining that the operation interval exceeds the time expressed by the fast double-tap determining threshold value SH.

The above operation interval being less than or equal to the amount of time expressed by the fast double-tap determining threshold value SH means that the double-tap operation is a fast double-tap operation conducted by the user in a hurried state of mind. For this reason, in step S61 the controller 15 identifies the operation position of the double-tap operation on the basis of the operation position of the first touch tap operation and the operation position of the second touch tap operation.

Specifically, in step S61 the controller 15 compares the operation position of the first touch tap operation to the operation position of the second touch tap operation, and in the case where the difference between the operation positions is less than or equal to a given difference, determines that the tap operations were performed at the same position, and identifies that operation position. Also, in the case where the difference between the operation position of the first touch tap operation and the operation position of the second touch tap operation is greater than a given difference, the controller 15 determines that the tap operations were performed at respectively different positions within a range that establishes a double-tap operation, and identifies each operation position.

Also, in step S61 the controller 15 controls the execution of processing corresponding to a fast double-tap operation at the identified operation position from among the processing of the currently active application program, and returns the process to step S41.

In contrast, upon advancing the process to step S52 by determining that the touch operation interval has exceeded the time expressed by the fast double-tap determining threshold value SH, the controller 15 determines whether or not the operation interval from the first touch tap operation time t1 to the second touch tap operation time t2 is less than or equal to the amount of time expressed by the normal double-tap determining threshold value SM stored in the input operation detection threshold value memory 16 (SH<t2−t1≤SM).

The controller 15 then advances the process to step S62 in the case of determining that the operation interval is less than or equal to the time expressed by the normal double-tap determining threshold value SM, and advances the process to step S53 in the case of determining that the operation interval has exceeded the time expressed by the normal double-tap determining threshold value SM.

The above operation interval being less than or equal to the amount of time expressed by the normal double-tap determining threshold value SM means that the double-tap operation is a double-tap operation at normal speed conducted by the user in an ordinary state of mind. For this reason, in step S62 the controller 15 identifies the operation position of the double-tap operation on the basis of the operation position of the first touch tap operation and the operation position of the second touch tap operation.

Also, in step S62 the controller 15 controls the execution of processing corresponding to a normal double-tap operation at the identified operation position in the currently active application program, and returns the process to step S41.

In contrast, upon advancing the process to step S53 by determining that the above operation interval has exceeded the time expressed by the normal double-tap determining threshold value SM, the controller 15 determines whether or not the operation interval from the first touch tap operation time t1 to the second touch tap operation time t2 is less than or equal to the amount of time expressed by the slow double-tap determining threshold value SL stored in the input operation detection threshold value memory 16 (SM<t2−t1≤SL).

The controller 15 then advances the process to step S63 in the case of determining that the operation interval is less than or equal to the time expressed by the slow double-tap determining threshold value SL, and advances the process to step S54 in the case of determining that the operation interval has exceeded the time expressed by the slow double-tap determining threshold value SL.

The operation interval being less than or equal to the time expressed by the slow double-tap determining threshold value SL means that the touch double-tap operation is a slow double-tap operation conducted with the user in an unhurried state of mind. For this reason, in step S63 the controller 15 identifies the operation position of the double-tap operation on the basis of the operation position of the first touch tap operation and the operation position of the second touch tap operation.

Also, in step S63 the controller 15 controls the execution of processing corresponding to a slow double-tap operation at the identified operation position in the currently active application program, and returns the process to step S41.

Also, upon advancing the process to step S54 by determining that the operation interval has exceeded the time expressed by the slow double-tap determining threshold value SL, the controller 15 recognizes the first tap operation which was detected before detecting the second touch tap operation as a single-tap operation and controls the execution of processing corresponding to the single-tap operation in the currently active application program.

Also, in step S54 the controller 15 re-recognizes the second touch tap operation as a first touch tap operation, and returns the process to step S46. Thus, in step S47 and step S48, the presence or absence of a second touch tap operation is monitored until the elapsed time since the time t1 of the re-recognized first tap operation exceeds the time expressed by the slow double-tap determining threshold value SL.

Also, in step S60, the re-recognized first tap operation is likewise processed as a single-tap operation in the case where the elapsed time since the time t1 of the above re-recognized first tap operation has exceeded the time expressed by the slow double-tap determining threshold value SL.

Meanwhile, upon determining in step S45 of the flowchart in FIG. 26 that the first tap operation is a contactless tap operation, the controller 15 advances the process to step S55 and determines whether or not there exist at least a given number of capacitance values indicating values equal to or greater than the first threshold value for detecting a contactless tap operation indicated in FIGS. 22(*c*) and 22(*c*) among the capacitance values detected by the capacitive sensors of the touch panel 5.

Figure 29A:
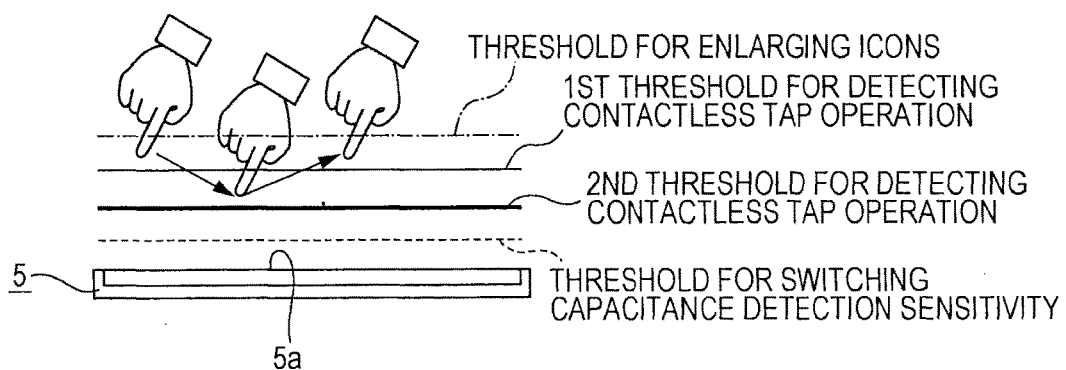
FIGS. 29A and 29B are diagrams for explaining a double-tap operation by contactless operation in a mobile phone according to a third embodiment.

Specifically, if the user conducts a contactless operation in which an operating element such as a finger approaches the touch panel 5 past the distance corresponding to the first threshold value and in which the operating element moves away from the touch panel 5 such that the distance between the touch panel 5 and the operating element does not become a distance corresponding to the second threshold value, as illustrated in FIG. 29(*a*), capacitance values equal to or greater than the first threshold value but less than the second threshold value are detected by capacitive sensors corresponding to the contactless operation position.

Upon detecting at least a given number of capacitance values equal to or greater than the first threshold value for detecting a contactless tap operation but less than the second threshold value for detecting a contactless tap operation, the controller 15 re-recognizes the contactless operation as a fast double-tap operation, and advances the process to step S58.

Then, in step S58 the controller 15 identifies the contactless operation position on the basis of the positions of the capacitive sensors that detected capacitance values equal to or greater than the first threshold value but less than the second threshold value, controls the execution of processing corresponding to a fast double-tap operation at the contactless operation position, and returns the process to step S41.

In contrast, the controller 15 advances the process to step S56 in the case of determining in step S55 that there do not exist at least a given number of capacitance values indicating values equal to or greater than the first threshold value for detecting a contactless tap operation indicated in FIGS. 22(*b*) and 22(*c*) among the capacitance values detected by the capacitive sensors of the touch panel 5.

In step S56, the controller 15 determines whether or not there exist at least a given number of capacitance values indicating values equal to or greater than the second threshold value for detecting a contactless tap operation but less than the threshold value for detecting a touch operation indicated in FIGS. 22(*b*) and 22(*c*) among the capacitance values detected by the capacitive sensors of the touch panel 5.

Figure 29B:
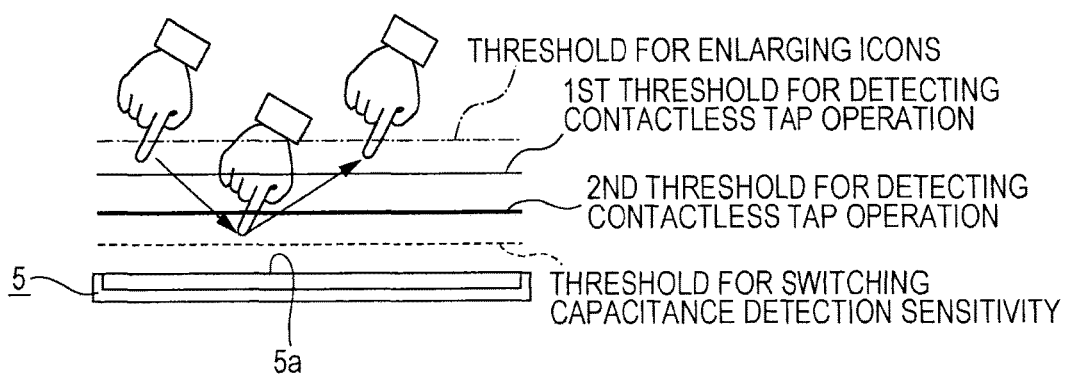

Specifically, if the user conducts a contactless operation in which an operating element such as a finger approaches the touch panel 5 past the distances corresponding to the first and second threshold values and in which the operating element moves away from the touch panel 5 such that the distance between the touch panel 5 and the operating element does not become a distance corresponding to the threshold value for detecting a touch operation, as illustrated in FIG. 29(b), capacitance values equal to or greater than the second threshold value but less than the threshold value for detecting a touch operation are detected by capacitive sensors corresponding to the contactless operation position.

Upon detecting at least a given number of capacitance values equal to or greater than the second threshold value for detecting a contactless tap operation but less than the threshold value for detecting a touch operation, the controller 15 recognizes the contactless operation as a slow double-tap operation, and advances the process to step S59.

Then, in step S59 the controller 15 identifies the contactless operation position on the basis of the positions of the capacitive sensors that detected capacitance values equal to or greater than the second threshold value but less than the threshold value for detecting a touch operation, controls the execution of processing corresponding to a slow double-tap operation at the contactless operation position, and returns the process to step S41.

However, since a contactless operation cannot be identified in the case of not detecting at least a given number of capacitance values equal to or greater than the second threshold value for detecting a contactless tap operation but less than the threshold value for detecting a touch operation, in step S57 the controller 15 cancels the first tap operation and returns the process to step S41 to enter a standby state for detection of a first tap operation.

[Information Processing According To Double-tap Operation Type And Operation Position In Third Embodiment]

Next, exemplary information processing corresponding to the type and operation position of a touch or contactless double-tap operation in a mobile phone of the third embodiment will be described.

First, in the case of a mobile phone of the third embodiment, if capacitance values detected by the capacitive sensors of the touch panel 5 become values equal to or greater than the threshold value for enlarging icons due to the user bringing an operating element such as a finger close to the touch panel 5, the controller 15 enlarges the icon that activates an application program list screen displayed on the touch panel 5 by a given factor, as illustrated in FIG. 30(a), for example.

Thus, since the user will operate an enlarged icon that activates an application program list screen, the icon that activates an application program list screen can be easily operated.

Next, in the case of detecting a normal touch double-tap operation (or a single-tap operation) at the display position of such an enlarged icon that activates an application program list screen, the controller 15 displays on the touch panel 5 a total of nine icons A to I disposed on the middle pane, as illustrated in FIG. 30(b).

In contrast, in the case of detecting a fast touch double-tap operation or a fast contactless double-tap operation at the display position of the middle column of the enlarged icon that activates an application program list screen, the controller 15 displays on the touch panel 5 icons for some of the most frequently used application programs among the nine icons A to I disposed on the middle pane, as illustrated in FIG. 30(c).

Similarly, in the case of detecting a fast touch double-tap operation or a fast contactless double-tap operation at the display position of the left column of the enlarged icon that activates an application program list screen, the controller 15 displays on the touch panel 5 icons for some of the most frequently used application programs among the eight icons S to Z disposed on the left pane, as illustrated in FIG. 30(d).

Similarly, in the case of detecting a fast touch double-tap operation or a fast contactless double-tap operation at the display position of the right column of the enlarged icon that activates an application program list screen, the controller 15 displays on the touch panel 5 icons for some of the most frequently used application programs among the nine icons J to R disposed on the right pane, as illustrated in FIG. 30(e).

[Advantages Of Third Embodiment]

As is apparent from the above description, a mobile phone according to a third embodiment executes respectively different information processing depending on the type and operation position of a touch double-tap operation, and also executes respectively different information processing depending on the type and operation position of a contactless double-tap operation.

Thus, since information processing can be conducted by detecting both touch double-tap operations and contactless double-tap operations, further improvement in the usability of the mobile phone can be attempted, in addition to obtaining advantages similar to those of the embodiments discussed earlier.

Also, in a mobile phone of the first and second embodiments discussed earlier, it is configured such that when the elapsed time since a first tap operation exceeds the time given by a threshold value for detecting a slow double-tap operation, that first tap operation is determined to be a single-tap operation.

In other words, in the case of a mobile phone of the first and second embodiments, determining a first tap operation to be a single-tap operation requires a wait time equal to the amount of time between the time when the first tap operation is performed and the time expressed by the threshold value for detecting a slow double-tap operation.

However, in a mobile phone of the third embodiment, it is configured such that only three types of operations, i.e., touch single-tap operations, contactless fast tap operations, and contactless slow tap operations, are accepted, thus making the controller 15 able to execute information processing corresponding to a single-tap operation immediately when a touch single-tap operation is performed.

For this reason, a threshold value for detecting a slow double-tap operation is not required, and since it can be configured such that the above wait time for detecting a slow double-tap operation is not required, rapid information processing is made possible, and further usability improvement can be attempted.

[Modifications]

Figure 31:
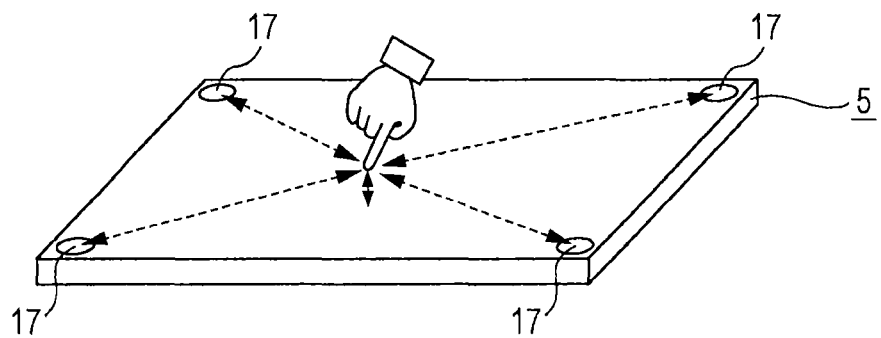
FIG. 31 is a diagram for explaining a modification of the present embodiments.

In the description of the embodiments discussed above, proximity of an operating element to the touch panel 5, single-tap operations, double-tap operations, and operation positions, etc. were taken to be detected on the basis of capacitance values detected by capacitive sensors in a display unit, but it may also be configured such that proximity of an operating element to the touch panel 5 and double-tap operations, etc. are detected by a proximity sensor 17 plurally provided on the case of the mobile phone, as illustrated in FIGS. 1 and 31.

In this case, although but an example, an infrared coupler is provided as the proximity sensor 17. The infrared coupler is configured to emit infrared light and detect the reflected light intensity of reflected light produced due to the emitted infrared light reflecting off an operating element such as the user's finger, as illustrated in FIG. 31.

For this reason, by providing a plurality of infrared couplers on the case of the mobile phone, it is possible to detect the distance between an operating element and the touch panel 5 and the presence or absence of a contactless double-tap operation, etc. on the basis of the reflected light intensity detected by each infrared coupler.

Consequently, it is possible to apply control for enlarging icons when an operating element comes into proximity with the touch panel 5 and conduct information processing corresponding to a contactless double-tap operation similarly as discussed earlier, and the same advantages as those of the embodiments discussed earlier can be obtained.

Also, although double-tap operations were described as being performed on the touch panel 5 or the hardware keys 6 in the embodiments discussed earlier, similar action and advantages can be obtained even in the case of using a mouse, a touchpad, or other input device.

Specifically, in the case of using a mouse, advantages similar to those discussed earlier can be obtained by controlling the execution of different information processing as discussed earlier according to the temporal interval between a first click operation and a second click operation in a double-click operation, or the temporal interval between a first click operation and a second click operation and their respective operation positions.

Also, in the case of using a slide pad, advantages similar to those discussed earlier can be obtained by controlling the execution of different information processing as discussed earlier according to the temporal interval between a first tap operation and a second tap operation in a double-tap operation, or the temporal interval between a first tap operation and a second tap operation and their respective operation positions.

Also, although primarily functions of application programs corresponding to icons were made to be controlled by double-tap operations in the embodiments discussed earlier, any functions may be subject to operation.

For example, during music playback as illustrated in FIGS. 7(*a*) and 7(*b*), the controller 15 may set the volume adjustment step size to a small step size in the case of detecting a fast double-tap operation on the playback screen, and the controller 15 may set the volume adjustment step size to a large step size in the case of detecting a slow double-tap operation on the playback screen.

Since the volume adjustment step size is set to a small step size by the controller 15 when the user performs a fast double-tap operation on the playback screen, a volume-raising control is conducted with a small step size, such as from level 0.2 to 0.4, 0.6, 0.8, 1.0, 1.2, and so on, when the user conducts a volume-raising operation, for example.

Similarly, since the volume adjustment step size is set to a small step size by the controller 15 when the user performs a fast double-tap operation on the playback screen, a volume-lowering control is conducted with a small step size, such as from level 1.2 to 1.0, 0.8, 0.6, 0.4, 0.2, 0.0, and so on, when the user conducts a volume-lowering operation, for example.

Also, since the volume adjustment step size is set to a large step size by the controller 15 when the user performs a slow double-tap operation on the playback screen, a volume-raising control is conducted with a large step size, such as from level 1.0 to 4.0, 0.8, 16.0, and so on, when the user conducts a volume-raising operation, for example.

Similarly, since the volume adjustment step size is set to a large step size by the controller 15 when the user performs a slow double-tap operation on the playback screen, a volume-lowering control is conducted with a large step size, such as from level 16.0 to 8.0, 4.0, 1.0, and so on, when the user conducts a volume-lowering operation, for example.

In this way, the present embodiments are applicable to the control of any function.

Also, although the embodiments discussed above were embodiments applied to a mobile phone, the present embodiments can be applied to an electronic device other than a mobile phone, such as a PHS phone (PHS: Personal Handyphone System), a PDA device (PDA: Personal Digital Assistant), an electronic camera device, an electronic video camera device, a portable game console, or a notebook personal computer, which is provided with input processing functions that display display objects corresponding to input operations on a display unit. Furthermore, the same advantages as those of the embodiments discussed earlier can be obtained in any case.

Lastly, embodiments other than the embodiments discussed earlier may occur as embodiments as a result of various alterations, combinations, etc. applied due to design or other factors within the scope of the claims or their equivalents. For this reason, the claimed invention is not limited to the foregoing embodiments, which were described by way of example. This is to be understood as obvious to those skilled in the art.

REFERENCE SIGNS LIST

1: antenna
2: communication circuit
3: speaker unit
4: microphone unit
5: touch panel
6: hardware keys
7: light emitter (LED: Light Emitting Diode)
8: camera unit
9: vibration unit
10: timer
11: acceleration sensor
12: GPS antenna
13: GPS unit
14: memory
15: controller
16: input operation detection threshold value memory
17: proximity sensor

What is claimed is:

1. An input processing apparatus, comprising:
circuitry configured to detect a time interval between consecutive input operations received at the input processing apparatus and conduct information processing based on the detected time interval;
a touch panel display device configured to display at least one icon corresponding to an application; and
a detector configured to detect a touch or tap operation by an object received at the touch panel display device as an input operation, the detector being configured to detect a position of each of the consecutive input operations received at the input processing apparatus relative to the displayed icon,
wherein the circuitry conducts information processing corresponding to the application based on the detected position of each of the consecutive input operations received at the displayed icon,
wherein the circuitry is configured to determine that the consecutive input operations constitute a double tap operation combined to correspond to a single type of information processing when the time interval is less than or equal to a first predetermined threshold and the consecutive input operations are received at the displayed icon, and determine that each of the consecutive input operations constitute a separate single tap operation which are not to be combined to correspond to the single type of information processing when the time interval is longer than the first predetermined threshold, wherein when the time interval is less than the first predetermined threshold to indicate the double tap operation, the circuitry determines whether or not the double tap operation corresponds to one of a plurality of predetermined double tap operation speeds based on the detected time interval, and the circuitry performs one of predetermined different layered information processing operations of the application based on which of the plurality of predetermined double tap operation speeds is determined, wherein at least one of the layered information processing operations includes transitioning the application from the displayed icon state to an activated application state in which a menu of a plurality of functions related to the application is displayed, and at least one of the layered information processing operations includes transitioning the application directly from the displayed icon state to an activated application state in which one of the plurality of functions is opened while bypassing the display of the menu of the plurality of functions.

2. The input processing apparatus according to claim 1, wherein the application is one of a camera program, a mail program, a music player program, and a map program.

3. The input processing apparatus according to claim 1, wherein the circuitry conducts a different type of information processing based on the detected position of each of the consecutive input operations being received at different portions of the displayed icon.

4. The input processing apparatus according to claim 1, further comprising:
a sensor configured to detect an object that is within a proximity of the input processing apparatus without contacting the input processing apparatus,
wherein the circuitry conducts the information processing based on the detected proximal position of the object relative to the input processing apparatus.

5. The input processing apparatus according to claim 4, wherein the sensor is capacitance sensor.

6. The input processing apparatus according to claim 4, wherein the circuitry conducts the information processing based on the detected proximal position of the object relative to the input processing apparatus being between a first threshold distance and a second threshold distance away from the input processing apparatus.

7. The input processing apparatus according to claim 6, wherein the sensor is capacitance sensor, the second threshold distance is closer to the input processing apparatus than the first threshold distance, and the circuitry changes a capacitance detection sensitivity of the sensor when the object is between a surface of the input processing apparatus and the second threshold distance.

8. The input processing apparatus according to claim 1, further comprising:
a storage configured to store a plurality of threshold time intervals each corresponding to one of the plurality of predetermined double tap operation speeds, and the circuitry conducts one of the predetermined different layered information processing operations of the application based on the detected time interval being within one of the respective plurality of threshold time intervals.

9. The input processing apparatus according to claim 1, wherein the circuitry determines whether or not the double tap operation corresponds to one of the plurality of predetermined double tap operation speeds by further determining whether the detected time interval is less than at least a second predetermined threshold smaller than the first predetermined threshold, and when the time interval is less than or equal to the second predetermined threshold, the circuitry conducts a first one of the predetermined different layered information processing operations of the application, and when the time interval is greater than the second predetermined threshold but less than or equal to the first predetermined threshold, the circuitry conducts a second one of the predetermined different layered information processing operations of the application.

10. The input processing apparatus according to claim 1, wherein the predetermined double tap operation speeds includes at least three double tap operation speeds.

11. A method, implemented on an input processing apparatus having a touch panel display device, comprising:
displaying, by the touch panel display device, at least one icon corresponding to an application
detecting a time interval between consecutive input operations received at the input processing apparatus;
conducting information processing based on the detected time interval;
wherein the detecting includes detecting a touch or tap operation by an object received at the touch panel display device as an input operations, and detecting a position of each of the consecutive input operations received at the input processing apparatus relative to the displayed icon,
and the conducting further includes conducting information processing corresponding to the application based on the detected position of each of the consecutive input operations received at the displayed icon, and
determining that the consecutive input operations constitute a double tap operation combined to correspond to a single type of information processing when the time interval is less than or equal to a first predetermined threshold and the consecutive input operations are received at the displayed icon, and determining that each of the consecutive input operations constitute a separate single tap operation which are not to be combined to correspond to the single type of information processing when the time interval is longer than the first predetermined threshold,
wherein when the time interval is less than the first predetermined threshold to indicate the double tap operation, the method includes determining whether or not the double tap operation corresponds to one of a plurality of predetermined double tap operation speeds based on the detected time interval, and performing one of predetermined different layered information processing operations of the application based on which of the plurality of predetermined double tap operation speeds is determined, wherein at least one of the layered information processing operations includes transitioning; the application from the displayed icon state to an activated application state in which a menu of a plurality of functions related to the application is displayed, and at least one of the layered information processing operations includes transitioning the application directly from the displayed icon state to an activated application state in which one of the plurality of functions is opened while bypassing the display of the menu of the plurality of functions.

* * * * *